United States Patent
Ibrahim et al.

(10) Patent No.: US 12,356,231 B2
(45) Date of Patent: Jul. 8, 2025

(54) SENSING AND SIGNALING OF INTER-USER EQUIPMENT (UE) CROSS LINK INTERFERENCE CHARACTERISTICS

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Huilin Xu, Temecula, CA (US); Seyedkianoush Hosseini, San Diego, CA (US); Thomas Valerrian Pasca Santhappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/853,724

(22) Filed: Jun. 29, 2022

(65) Prior Publication Data

US 2024/0007887 A1 Jan. 4, 2024

(51) Int. Cl.
*H04B 17/309* (2015.01)
*H04B 17/336* (2015.01)
*H04L 5/00* (2006.01)
*H04W 24/10* (2009.01)

(52) U.S. Cl.
CPC .......... *H04W 24/10* (2013.01); *H04B 17/336* (2015.01); *H04L 5/0051* (2013.01)

(58) Field of Classification Search
CPC .. H04B 17/309; H04B 17/336; H04B 17/345; H04B 17/346; H04B 17/347; H04B 17/354; H04W 24/10
See application file for complete search history.

(56) References Cited

U.S. PATENT DOCUMENTS

| | | | | |
|---|---|---|---|---|
| 2020/0067614 A1* | 2/2020 | Wang | ................... | H04J 11/0056 |
| 2021/0195462 A1* | 6/2021 | Pezeshki | ............... | H04W 72/23 |
| 2021/0368371 A1* | 11/2021 | Wang | ................... | H04L 5/0073 |
| 2023/0055304 A1* | 2/2023 | Shim | ................... | H04W 72/542 |

* cited by examiner

*Primary Examiner* — Bo Hui A Zhu
(74) *Attorney, Agent, or Firm* — Holland & Hart LLP

(57) ABSTRACT

Methods, systems, and devices for inter-UE cross link interference (CLI) characteristics are described. A UE may transmit, to a network entity, capability information indicating a capability of the UE to support one or more schemes for determining characteristics of an inter-UE CLI channel. The network entity may transmit, based on the capability information, an indication of a selected scheme of the one or more schemes for determining the characteristics of the channel. The UE may perform a set of measurements of the characteristics and may transmit assistance information in accordance with the selected scheme. The assistance information may pertain to the channel and may include the set of multiple measurements. The UE may also transmit an indication of the channel's variation or an indication of a coherence time. The network entity may transmit one or more updated channel parameters in response to receiving the assistance information.

30 Claims, 17 Drawing Sheets

SENSING AND SIGNALING OF INTER-USER EQUIPMENT (UE) CROSS LINK INTERFERENCE CHARACTERISTICS

TECHNICAL FIELD

The following relates to wireless communication at a user equipment (UE), and more specifically to sensing and signaling of inter-UE cross link interference (CLI) characteristics.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Components within a wireless communication system may be coupled (for example, operatively, communicatively, functionally, electronically, and/or electrically) to each other.

SUMMARY

The described techniques relate to improved methods, systems, devices, and apparatuses that support sensing and signaling of inter-user equipment (UE) cross link interference (CLI) characteristics. For example, a UE may transmit a capability message to a network entity, where the capability message may indicate a capability of the UE to support one or more schemes for determining characteristics of a CLI channel between the UE and another device (e.g., a transmitter or a receiver). In response to the capability message, the network entity may select a scheme from the one or more schemes, and may transmit an indication of the selected scheme to the UE. Based on the selected scheme, the UE may perform one or more measurements of the characteristics of the CLI channel. In some examples, the UE may determine a rate of change of the characteristics based on sensing the channel (e.g., based on the measurements), and may determine a channel variation based on the rate of change. In some examples, the UE may determine an estimation of coherence time associated with the variation. In some cases, the UE may transmit an indication of the variation or the estimation of the coherence time to the network entity. Additionally, or alternatively, the UE may compress one or more characteristics or other parameters of the CLI channel for transmitting to the network entity. Based on the assistance information and the one or more indications, the network entity may adjust one or more channel parameters at the network entity or the UE, and may transmit the updated channel parameters to the UE. The network entity may also transmit a configuration for one or more precoded or unprecoded sounding reference signals (SRS) to the UE for CLI channel estimation based on the variation, the estimation of the time coherence, the assistance information, or a combination thereof.

A method for wireless communication at a user equipment (UE) is described. The method may include transmitting, to a network entity, capability information indicating a capability of the UE to support one or more schemes for determining characteristics of an inter-UE CLI channel over a time period, receiving, from the network entity and based on the capability information, an indication of a selected scheme of the one or more schemes for determining the characteristics of the inter-UE CLI channel, and transmitting, to the network entity, assistance information in accordance with the selected scheme, the assistance information pertaining to the inter-UE CLI channel.

An apparatus for wireless communication at a UE is described. The apparatus may include a processor, memory coupled (e.g., operatively, communicatively, functionally, electronically, or electrically) to the processor, and instructions stored in the memory. The instructions may be executable by the processor to cause the apparatus to transmit, to a network entity, capability information indicating a capability of the UE to support one or more schemes for determining characteristics of an inter-UE CLI channel over a time period, receive, from the network entity and based on the capability information, an indication of a selected scheme of the one or more schemes for determining the characteristics of the inter-UE CLI channel, and transmit, to the network entity, assistance information in accordance with the selected scheme, the assistance information pertaining to the inter-UE CLI channel.

Another apparatus for wireless communication at a UE is described. The apparatus may include means for transmitting, to a network entity, capability information indicating a capability of the UE to support one or more schemes for determining characteristics of an inter-UE CLI channel over a time period, means for receiving, from the network entity and based on the capability information, an indication of a selected scheme of the one or more schemes for determining the characteristics of the inter-UE CLI channel, and means for transmitting, to the network entity, assistance information in accordance with the selected scheme, the assistance information pertaining to the inter-UE CLI channel.

A non-transitory computer-readable medium storing code for wireless communication at a UE is described. The code may include instructions executable by a processor to transmit, to a network entity, capability information indicating a capability of the UE to support one or more schemes for determining characteristics of an inter-UE CLI channel over a time period, receive, from the network entity and based on the capability information, an indication of a selected scheme of the one or more schemes for determining the characteristics of the inter-UE CLI channel, and transmit, to the network entity, assistance information in accordance with the selected scheme, the assistance information pertaining to the inter-UE CLI channel.

Some examples of the method, apparatuses, and non-transitory computer-readable medium described herein may further include operations, features, means, or instructions for performing a set of multiple measurements of the characteristics of the inter-UE CLI channel in accordance with the selected scheme, where the assistance information includes the set of multiple measurements of the characteristics of the inter-UE CLI channel.

Some examples of the method, apparatuses, and non-transitory computer-readable medium described herein may further include operations, features, means, or instructions for determining a rate of change of the characteristics of the inter-UE CLI channel based on sensing the inter-UE CLI channel, determining a channel variation in time of the inter-UE CLI channel based on the rate of change of the characteristics of the inter-UE CLI channel, and transmitting an indication of the channel variation in time of the inter-UE CLI channel.

In some examples of the method, apparatuses, and non-transitory computer-readable medium described herein, transmitting the indication of the channel variation may include operations, features, means, or instructions for transmitting an indication of a likelihood that the inter-UE CLI channel may be varying over a time period.

In some examples of the method, apparatuses, and non-transitory computer-readable medium described herein, the indication of the likelihood that the inter-UE CLI channel may be varying includes a value from a range of values indicating a degree with which the inter-UE CLI channel may be varying.

In some examples of the method, apparatuses, and non-transitory computer-readable medium described herein, the indication of the likelihood that the inter-UE CLI channel may be varying includes a one-bit indication.

Some examples of the method, apparatuses, and non-transitory computer-readable medium described herein may further include operations, features, means, or instructions for performing a set of multiple measurements of the characteristics of the inter-UE CLI channel in accordance with the selected scheme, determining, based on the set of multiple measurements of the characteristics of the inter-UE CLI channel, at least one of an estimation of coherence time associated with a variation of the inter-UE CLI channel, a coherence time metric, one or more statistics related to the inter-UE CLI channel, an inter-UE CLI channel feedback, or a combination thereof, and transmitting, to the network entity, an indication of at least one of the estimation of coherence time, the coherence time metric, the one or more statistics related to the inter-UE CLI channel, the inter-UE CLI channel feedback, or a combination thereof.

Some examples of the method, apparatuses, and non-transitory computer-readable medium described herein may further include operations, features, means, or instructions for compressing the assistance information prior to transmitting the assistance information to the network entity, where compressing the assistance information includes compressing the inter-UE CLI channel using an auto-encoder.

Some examples of the method, apparatuses, and non-transitory computer-readable medium described herein may further include operations, features, means, or instructions for receiving, from the network entity, one or more updated channel parameters in response to transmitting the assistance information.

Some examples of the method, apparatuses, and non-transitory computer-readable medium described herein may further include operations, features, means, or instructions for receiving, from the network entity, a request to measure the characteristics of the inter-UE CLI channel and performing a set of multiple measurements of the characteristics of the inter-UE CLI channel based on receiving the request.

Some examples of the method, apparatuses, and non-transitory computer-readable medium described herein may further include operations, features, means, or instructions for receiving, from the network entity, a configuration for a first set of SRSs associated with a first periodicity and a configuration for a second set of SRSs associated with a second periodicity, where the first set of SRSs and the second set of SRSs may be determined based on the assistance information.

Some examples of the method, apparatuses, and non-transitory computer-readable medium described herein may further include operations, features, means, or instructions for receiving, from the network entity, a configuration for a set of precoded SRSs for inter-UE CLI channel measurement or a set of unprecoded SRSs for inter-UE CLI channel measurement or both.

In some examples of the method, apparatuses, and non-transitory computer-readable medium described herein, the assistance information includes at least one of a CLI report, a reference signal received power (RSRP) report, a CLI channel impulse response, frequency domain channel information, or a combination thereof.

A method for wireless communication at a network entity is described. The method may include receiving, from a UE, capability information indicating a capability of the UE to support one or more schemes for determining characteristics of an inter-UE CLI channel over a time period, transmitting, to the UE and based on the capability information, an indication of a selected scheme of the one or more schemes for determining the characteristics of the inter-UE CLI channel, and receiving, from the UE, assistance information in accordance with the selected scheme, the assistance information pertaining to the inter-UE CLI channel.

An apparatus for wireless communication at a network entity is described. The apparatus may include a processor, memory coupled (e.g., operatively, communicatively, functionally, electronically, or electrically) to the processor, and instructions stored in the memory. The instructions may be executable by the processor to cause the apparatus to receive, from a UE, capability information indicating a capability of the UE to support one or more schemes for determining characteristics of an inter-UE CLI channel over a time period, transmit, to the UE and based on the capability information, an indication of a selected scheme of the one or more schemes for determining the characteristics of the inter-UE CLI channel, and receive, from the UE, assistance information in accordance with the selected scheme, the assistance information pertaining to the inter-UE CLI channel.

Another apparatus for wireless communication at a network entity is described. The apparatus may include means for receiving, from a UE, capability information indicating a capability of the UE to support one or more schemes for determining characteristics of an inter-UE CLI channel over a time period, means for transmitting, to the UE and based on the capability information, an indication of a selected scheme of the one or more schemes for determining the characteristics of the inter-UE CLI channel, and means for receiving, from the UE, assistance information in accordance with the selected scheme, the assistance information pertaining to the inter-UE CLI channel.

A non-transitory computer-readable medium storing code for wireless communication at a network entity is described. The code may include instructions executable by a processor to receive, from a UE, capability information indicating a capability of the UE to support one or more schemes for determining characteristics of an inter-UE CLI channel over a time period, transmit, to the UE and based on the capability information, an indication of a selected scheme of the one or more schemes for determining the characteristics of the inter-UE CLI channel, and receive, from the UE, assistance information in accordance with the selected scheme, the assistance information pertaining to the inter-UE CLI channel.

In some examples of the method, apparatuses, and non-transitory computer-readable medium described herein, receiving the assistance information may include operations, features, means, or instructions for receiving a set of multiple measurements of the characteristics of the inter-UE CLI channel in accordance with the selected scheme, where the assistance information includes the set of multiple measurements of the characteristics of the inter-UE CLI channel.

Some examples of the method, apparatuses, and non-transitory computer-readable medium described herein may further include operations, features, means, or instructions for receiving, from the UE, an indication of a channel variation in time of the inter-UE CLI channel, where the channel variation in time of the inter-UE CLI channel may be based on a rate of change of the characteristics of the inter-UE CLI channel.

In some examples of the method, apparatuses, and non-transitory computer-readable medium described herein, receiving the indication of the channel variation may include operations, features, means, or instructions for receiving an indication of a likelihood that the inter-UE CLI channel may be varying over a time period.

In some examples of the method, apparatuses, and non-transitory computer-readable medium described herein, the indication of the likelihood that the inter-UE CLI channel may be varying includes a value from a range of values indicating a degree with which the inter-UE CLI channel may be varying.

In some examples of the method, apparatuses, and non-transitory computer-readable medium described herein, the indication of the likelihood that the inter-UE CLI channel may be varying includes a one-bit indication.

Some examples of the method, apparatuses, and non-transitory computer-readable medium described herein may further include operations, features, means, or instructions for receiving, from the UE, an indication of at least one of an estimation of coherence time associated with a variation of the inter-UE CLI channel, a coherence time metric, one or more statistics related to the inter-UE CLI channel, an inter-UE CLI channel feedback, or a combination thereof, where the estimation may be based on the characteristics of the inter-UE CLI channel.

Some examples of the method, apparatuses, and non-transitory computer-readable medium described herein may further include operations, features, means, or instructions for transmitting, to the UE, one or more updated channel parameters in response to receiving the assistance information.

Some examples of the method, apparatuses, and non-transitory computer-readable medium described herein may further include operations, features, means, or instructions for transmitting, to the UE, a request to measure the characteristics of the inter-UE CLI channel.

Some examples of the method, apparatuses, and non-transitory computer-readable medium described herein may further include operations, features, means, or instructions for transmitting, to the UE, a configuration for a first set of SRSs associated with a first periodicity and a configuration for a second set of SRSs associated with a second periodicity, where the first set of SRSs and the second set of SRSs may be determined based on the assistance information.

Some examples of the method, apparatuses, and non-transitory computer-readable medium described herein may further include operations, features, means, or instructions for transmitting, to the UE, a configuration for a set of precoded SRSs for inter-UE CLI channel measurement or a set of unprecoded SRSs for inter-UE CLI channel measurement or both.

In some examples of the method, apparatuses, and non-transitory computer-readable medium described herein, the assistance information includes at least one of a CLI report, an RSRP report, a CLI channel impulse response, frequency domain channel information, or a combination thereof.

DETAILED DESCRIPTION

Figure 1:
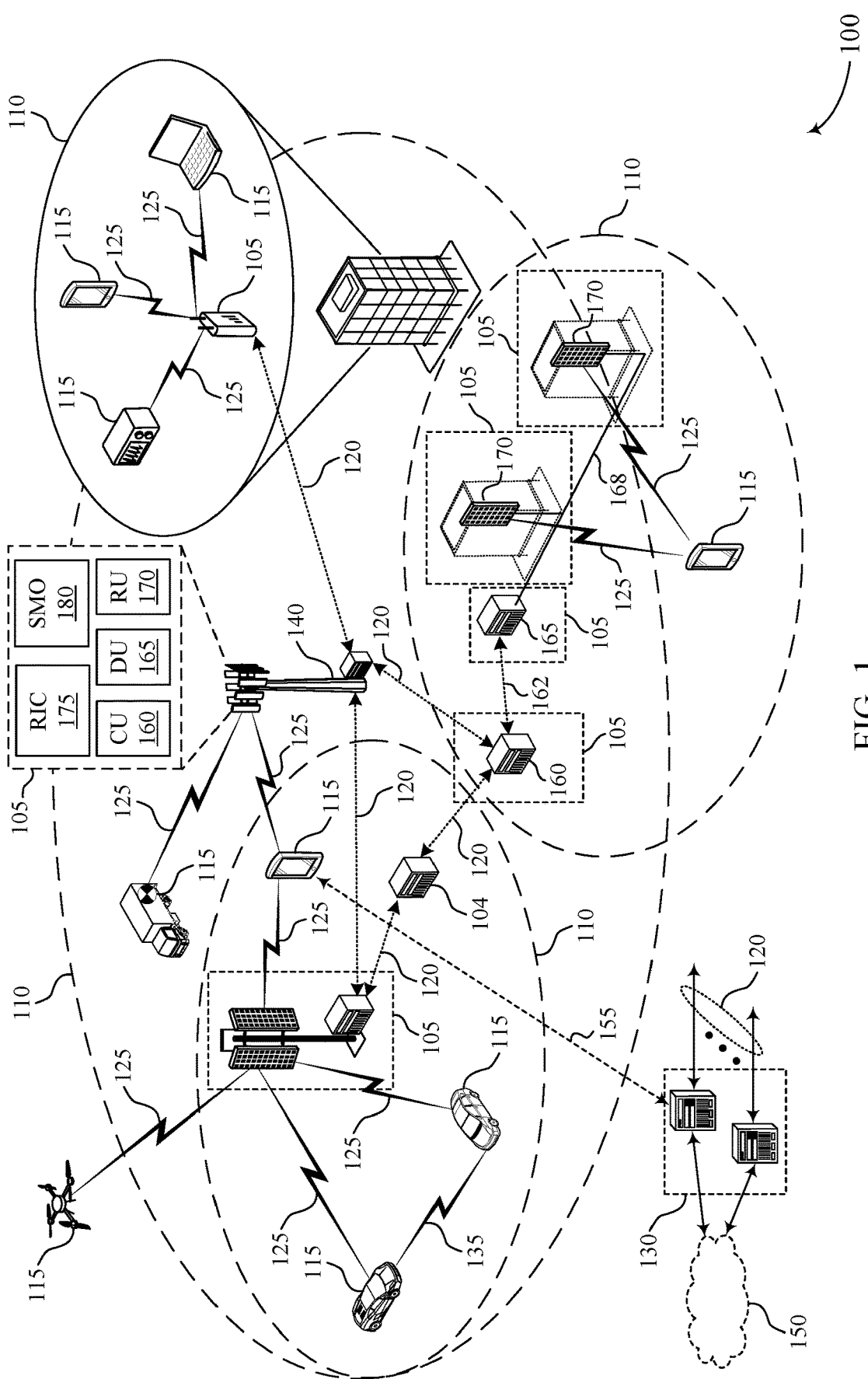
FIG. 1 illustrates an example of a wireless communications system that supports sensing and signaling of inter-user equipment (UE) cross link interference (CLI) characteristics in accordance with one or more aspects of the present disclosure.

Some wireless communications systems may support full-duplex communications, in which downlink and uplink messages are communicated simultaneously. In some cases, full-duplex communications may result in cross link interference (CLI) that is experienced at a user equipment (UE), which may degrade a signal quality of a downlink message received at the UE. For example, if a network entity concurrently transmits a downlink message to a first UE and receives an uplink message from a second UE, the uplink message from the second UE may interfere with the downlink message at the first UE, thereby reducing a reliability of the downlink message received at the first UE. Such interference may be referred to as CLI. In some cases, the effects of CLI may be mitigated to improve full-duplex communication performance by using a first scheme employing an enhanced channel state feedback design based on projected CLI, where an unprecoded CLI reference signal (CLI-RS) may be used for estimating an CLI channel. By considering CLI in generating feedback, a network entity may select precoding parameters to reduce impact of CLI. Alternatively, the effects of CLI may be mitigated using a second scheme which includes a precoded CLI-RS for mimicking a future physical uplink shared channel (PUSCH) transmission to achieve accurate channel state feedback reporting from a UE.

Techniques described herein may support a network entity selecting a scheme employing an enhanced channel state feedback design or another scheme including a precoded CLI-RS based on different assisting information and feedback from a UE. For example, a network entity may determine whether a CLI channel is fast-varying based on acquiring assisting information about the CLI channel from a UE. In some examples, the network entity may predict dynamics of a CLI channel based on comparing uplink and downlink scheduling parameters over time, based on explicit CLI reports from a UE, or both. In some cases, a UE (e.g., a victim UE) may determine a hard or soft decision on the time-varying nature of the CLI channel and may indicate the time-varying nature to the network entity via a feedback message. Additionally, or alternatively, the UE may calculate one or more intermediate metrics for determining the time-varying nature, and may report the intermediate metrics to the network entity, where the network entity may make a final determination on the time-varying nature based on the intermediate metrics. In some examples, the network entity may use both schemes simultaneously by configuring two sounding reference signal (SRS) resources based on feedback from the UE. For example, the network entity may configure a first SRS resource with low-periodicity for measuring an unprecoded CLI channel and a second SRS resource with a higher periodicity based on a precoded CLI-RS.

Aspects of the disclosure are initially described in the context of wireless communications systems. Aspects of the disclosure are additionally described in the context of a flowchart diagram and a process flow. Aspects of the disclosure are further illustrated by and described with reference to apparatus diagrams, system diagrams, and flowcharts that relate to sensing and signaling of inter-UE CLI characteristics.

FIG. 1 illustrates an example of a wireless communications system 100 that supports sensing and signaling of inter-UE CLI characteristics in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a device such as a cellular phone, a smart phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or a machine type communications (MTC) device, or the like, which may be implemented in various articles such as appliances, drones, robots, vehicles, meters, or the like. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140).

The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support sensing and signaling of inter-UE CLI characteristics in full duplex as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or an MTC device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $TS=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

In some examples, codebook-based feedback may include transmitting feedback using one or more codebooks. For example, a network entity 105 may configure a UE 115 with one or more SRS resources based on a capability of the UE 115 or based on a codebook restriction. The UE 115 may respond by transmitting one or more SRSs using the configured SRS resources which the network entity 105 may use for estimating an uplink channel of the UE 115. For example, the network entity 105 may determine an uplink beam and a precoder and rank for the uplink beam based on the channel estimation and codebook subset restriction. In some examples, the network entity 105 may transmit, to the UE 115, a transmit precoding matrix indicator (TPMI) and an SRS resource indicator (SRI) in a downlink control information (DCI) grant. In some examples, the UE 115 may transmit a PUSCH using the precoder based on the TPMI indicated in the DCI grant. In some cases, the network entity 105 may provide feedback based on the PUSCH transmission (e.g., may transmit HARQ feedback). In some cases, the network entity 105 may also indicate the rank to the UE 115 via a transmit rank indicator (TRI). In some examples, uplink and downlink reciprocity may not be present in codebook-based feedback. In some cases, the network entity 105 may use RRC signaling to indicate to the UE 115 to use codebook based feedback.

In some examples, non-codebook based feedback may involve transmitting feedback based on a precoder calculated at a UE 115. In some examples, the UE 115 may calculate one or more uplink precoders based on a downlink CSI-RS transmitted from the network entity 105. A network entity 105 may configure the UE 115 with SRS resources by selecting SRS resources and transmitting an SRI in a DCI grant as described herein. In some examples, a TPMI may not be provided to the UE 115, and a PMI may not be provided by the UE 115. In some examples, each SRS resource may be associated with a single port, and the SRI field may select a subset of SRS resources, where each SRS resource may map to one uplink layer. In some cases, if the UE 115 supports L layers for spatial multiplexing, the UE 115 may support transmitting L SRS resources in a same symbol. In some cases, the network entity 105 may configure the UE 115 with CSI-RS resources and a spatial association between CSI-RS and SRS resources based on a capability of the UE 115, the capability including coherence capability and a number of ports. In some examples, the UE 115 may transmit a PUSCH using layers selected based on the DCI grant using the one or more calculated precoders for one or more SRS resources. In some cases, the network entity 105 may provide feedback based on the PUSCH transmission (e.g., may transmit HARQ feedback). In some examples, uplink and downlink reciprocity may be present in non-codebook based feedback (e.g., via presence of TDD). In some cases, the network entity 105 may use RRC signaling to indicate to the UE 115 to use non-codebook based feedback.

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may support the communication of channel state information (CSI) between communication devices. For example, communication devices (e.g., network entities 105, UEs 115) may exchange CSI (e.g., a network entity 105 may gather CSI from a UE 115, UEs 115 may exchange CSI) to efficiently configure and schedule the channel. In some examples, this information may be sent from a UE 115 in the form of a CSI report. A CSI report may contain: a rank indicator (RI)

requesting a quantity of layers (e.g., spatial layers) to be used for transmissions (e.g., based on antenna ports of the UE 115); a layer indicator (LI) indicating a strongest layer of the quantity of layers requested by the RI; a PMI indicating a preference for which precoder matrix should be used (e.g., based on a quantity of layers); a channel quality indicator (CQI) representing a highest order modulation scheme that may be used; a CSI-RS resource indicator (CRI) indicating a preferred beam for communicating with a communication device (e.g., a network entity 105, another UE 115); a synchronization signal block (SSB) resource indicator (SSBRI) indicating an SSB that the UE 115 receives with a highest received power (e.g., reference signal received power (RSRP), or a combination thereof, among other examples of CSI that may be included in a CSI report.

In some cases, an RI may be associated with a quantity of antennas used by a device. CQI may be calculated by a UE 115 in response to receiving predetermined pilot symbols such as CRSs or CSI-RSs. RI and PMI may be excluded if the UE 115 does not support spatial multiplexing (or is not in a supported spatial mode). In some examples, the types of information included in the CSI report may determine a reporting type (e.g., a type I CSI report, a type II CSI report, among other CSI report types). In some examples, a CSI report may be periodic, aperiodic, or semi-persistent.

Based on gathered CSI, a network entity 105 may indicate various parameters for a UE 115 to use in transmitting uplink messages to the network entity 105. For example, a network entity 105 may transmit a TPMI to a UE 115 that indicates a precoding matrix for the UE 115 to use in precoding and transmitting an uplink message to the network entity 105 as described herein. In some examples, the TPMI may correspond to a PMI reported by the UE 115. In some examples, the TPMI may indicate a different precoding matrix than a precoding matrix indicated by a reported PMI. In some examples, the network entity 105 may indicate the precoding matrix by indicating an index of the TPMI. For example, the UE 115 may be configured with or otherwise store various precoding matrices corresponding to various TPMI indexes. Accordingly, the network entity 105 may indicate a precoding matrix W to the UE 115 by transmitting a TPMI that includes a TPMI index, for example, of a table of TPMI indexes, where each table of TPMI indexes corresponds to transmissions using various combinations of antenna ports and spatial layers.

Additionally, or alternatively, the network entity may transmit a transmission rank indicator (TRI) to a UE 115 that indicates a rank according to which the UE 115 is to transmit an uplink message to the network entity 105 (e.g., a quantity of spatial layers that the UE 115 is to use). In some examples, the TRI may correspond to an RI reported by the UE 115. In some examples, the TRI may indicate a different quantity of spatial layers than a quantity of spatial layers indicated by a reported RI.

The wireless communications system 100 may support full duplex communications (e.g., a mode that supports two-way communication via concurrent transmission and reception) between communication devices. For example, a network entity 105 may concurrently transmit a downlink message to a first UE 115 and receive an uplink message from a second UE 115. Additionally, or alternatively, a network entity 105 and a UE 115 may concurrently communicate a downlink message and an uplink message with each other. Additionally, or alternatively, a UE 115 may concurrently receive a downlink message from a first network entity 105 and transmit an uplink message to a second network entity 105. Other examples of full duplex communications between communication devices may be supported.

In some examples, full duplex communications may be in-band full duplex communications or subband full duplex communications. For example, in an example of in-band full duplex communication, an uplink message and a downlink message may be concurrently transmitted via shared time and frequency resources. That is, a time resource and a frequency resource (e.g., a slot and bandwidth) via which the uplink message is communicated may overlap (e.g., full or partial overlap) with a time and frequency resource via which the downlink message is communicated. In an example of subband full duplex communications (also known as flexible duplex), an uplink message and a downlink message may be concurrently transmitted via shared time resources, but via different frequency resources. That is, the uplink message and the downlink message may be communicated via overlapping time resources (e.g., fully overlapping, such as via a same slot, or partially overlapping). However, the uplink message and the downlink message may be communicated via non-overlapping frequency resources (e.g., via different subbands of a bandwidth). In some examples, a guard band may separate the frequency resources of the uplink message and the downlink message in the frequency domain.

In some cases, full duplex communications (in-band or subband) may include a slot format, such as a "D+U" format. For example, a "D+U" slot may include a slot in which a band is used for both uplink and downlink transmissions. In some examples, in a given "D+U" symbol, a half-duplex UE may transmit in either an uplink band or may receive in a downlink band, where a full-duplex UE may transmit in the uplink band and may receive in the downlink band at the same time. In some cases, a "D+U" slot may contain downlink only symbols, uplink only symbols, or full-duplex symbols (e.g., for downlink and uplink).

In some cases, CLI may be associated with full duplex communications. For example, because full duplex communications are communicated concurrently in time, a full duplex downlink message may interfere with a full duplex uplink message, or vice versa. For example, inter-UE CLI may refer to the CLI caused by an uplink message transmitted by a first UE 115 interfering with a downlink message concurrently received at a second UE 115. For example, inter-gNB CLI may refer to the CLI caused by a downlink message transmitted by a first base station 140 interfering with an uplink message concurrently received at a second base station 140. CLI may degrade a reliability or signal quality of full duplex communications.

In some examples, inter-UE CLI in the wireless communications system 100 may be mitigated by employing different precoded or non-precoded techniques. For example, the wireless communications system 100 may implement non-precoded enhanced channel state feedback as described with reference to FIG. 4. Enhanced channel state feedback may first include a network entity 105 indicating, to a first UE 115 and a second UE 115, transmission parameters for communicating an unprecoded multi-port CLI-RS. The second UE 115 may transmit the multi-port CLI-RS to the first UE 115 using two or more transmit antenna ports. The first UE 115 may receive the multi-port CLI-RS using two or more receive antenna ports and may estimate a CLI channel between the first UE 115 and the second UE 115 based on measurements of the multi-port CLI-RS. Based on the CLI channel and one or more precoding parameters associated with uplink precoding at the second UE 115 (e.g., a candidate precoding matrix for precoding an uplink message at the second UE 115), the first UE 115 may estimate CLI at the first UE 115. Accordingly, the first UE 115 may estimate a channel between the first UE 115 and the network entity 105 based on the estimated CLI in addition to a CSI-RS received from the network entity 105 (e.g., rather than considering only the CSI-RS). As such, the first UE 115 may generate and report CSI based on a channel estimate that considers the impact of potential CLI caused by the second UE 115.

By way of another example, the wireless communications system 100 may implement a precoded CLI-RS as described with reference to FIG. 4. For example, a network entity 105 may trigger transmission of a precoded CLI-RS and a precoded PUSCH from a second UE 115, where both the CLI-RS and the PUSCH may be precoded using the same precoder. Thus, the CLI-RS may mimic a future PUSCH transmission. A first UE 115 may then estimate CLI and thus a CLI channel between the first UE 115 and the second UE 115 based on the CLI-RS (e.g., transmitted by the second UE 115). As the CLI-RS is precoded, the first UE 115 may thus account for the precoded CLI channel, including both the unprecoded CLI channel and the precoder. The described techniques may thus provide a method to achieve accurate channel state feedback reporting from the first UE 115. However, the wireless communications system 100 may lack a method for deciding between unprecoded and precoded CLI channel estimation and feedback.

As described herein, the wireless communications system 100 may include techniques for deciding between methods for estimating a CLI channel between two UEs 115. For example, a UE 115 may transmit a capability message to a network entity 105 indicating one or more capabilities for performing measurements, processing information, or for transmitting one or more payloads. The network entity 105 may select a scheme based on the capability message and may transmit an indication of the scheme to the UE 115. Based on the selected scheme in the scheme indication, the UE 115 and the network entity 105 may perform one or more processes and may communicate to make a final decision on a time-varying nature of the CLI channel. For example, the UE 115 may determine a hard or soft decision of the time-varying nature based on performing one or more measurements on the CLI channel, and may indicate the decision to the network entity 105 (e.g., via uplink control information (UCI)). By way of another example, the UE 115 may perform the one or more measurements and may indicate the one or more measurements to the network entity 105, where the network entity 105 may determine the time-varying nature of the CLI channel based on the one or more measurements. Additionally, or alternatively, the network entity 105 and the UE 115 may split processing, where the UE 115 may transmit one or more compressed parameters of the CLI channel to the network entity 105 for making a final decision. In some examples, the network entity 105 may determine to make the decision based on indirect information instead.

Figure 2:
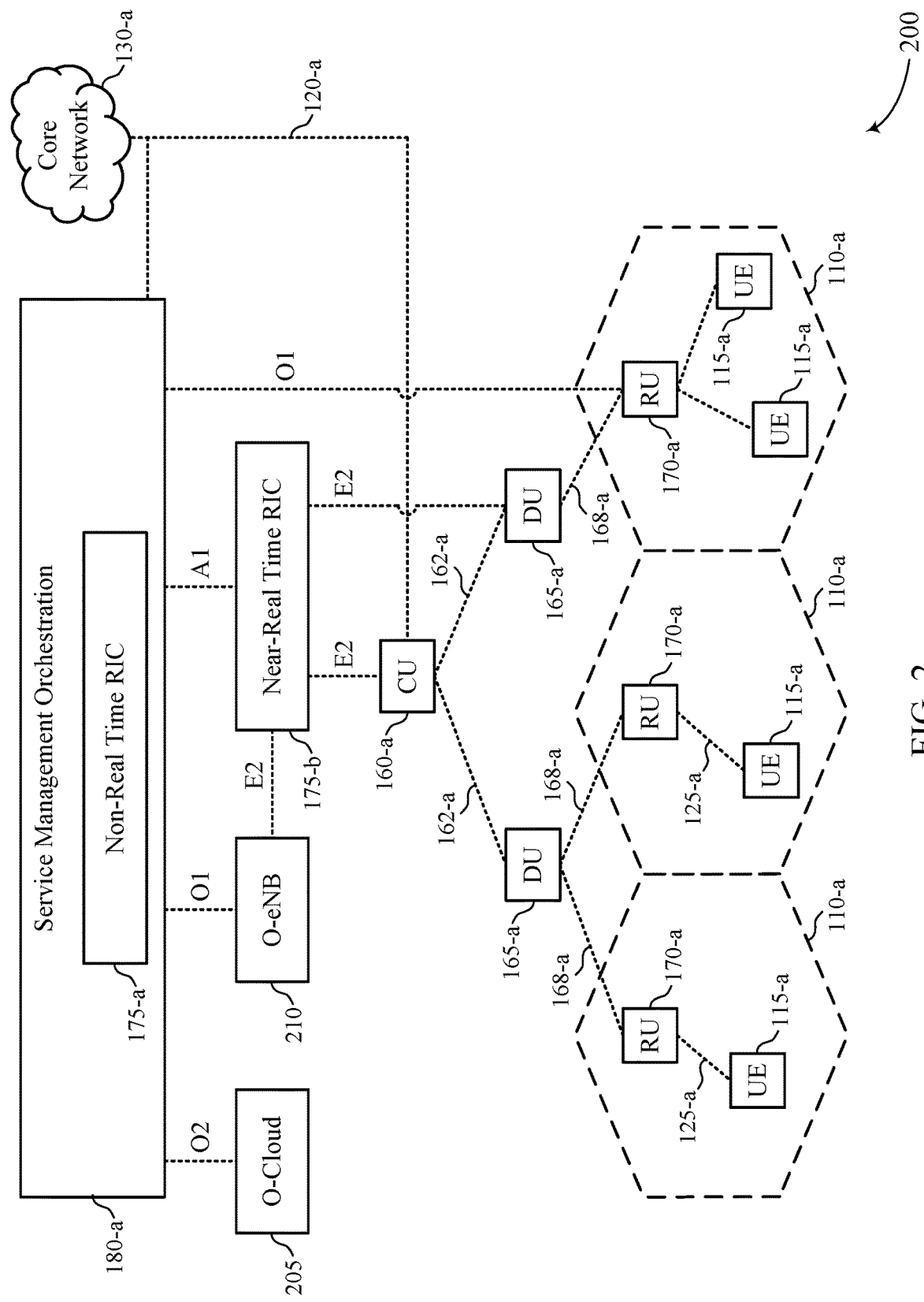
FIG. 2 illustrates an example of a network architecture that supports sensing and signaling of inter-UE CLI characteristics in accordance with one or more aspects of the present disclosure.

FIG. 2 illustrates an example of a network architecture 200 (e.g., a disaggregated base station architecture, a disaggregated RAN architecture) that supports sensing and signaling of inter-UE CLI characteristics in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals via a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, via a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an A1 interface) the Near-RT RIC 175-b. The Near-RT RIC 175-b may be configured to include a logical function that enables near-real-time control and optimization of RAN elements and resources via data collection and actions via an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via O1) or via generation of RAN management policies (e.g., A1 policies).

In accordance with examples described herein, a UE 115-a may transmit one or more messages to a network entity 105 for estimating inter-UE CLI. For example, a UE 115-a may transmit a capability message to an RU 170-a, the capability message indicating capability for performing one or more measurements, one or more transmissions, or processing at the UE 115-a in accordance with one or more schemes for determining dynamics of a CLI channel. The RU 170-a may relay the capability message to a DU 165-a or a CU 160-a, and based on the capability message, a CU 160-a or a DU 165-a may determine a scheme for measuring dynamics of the CLI channel. The CU 160-a or the DU 165-a may relay indication of the scheme to the UE 115-a (e.g., via the RU 170-a). Based on the indicated scheme, the UE 115-a may transmit, to an RU 170-a, a hard or soft decision of a time-varying nature of a CLI channel, one or more parameters or measurements of the CLI channel, or one or more compressed parameters of the CLI channel.

In some cases, a UE 115-a may transmit CSI that is based on inter-UE CLI that is estimated based on a multi-port CLI-RS, or a precoded CSI. For example, based on a decided time-varying nature of a CLI channel, a CU 160-a or a DU 165-a may determine to use unprecoded enhanced channel state feedback or precoded channel state feedback as described herein. The CU 160-a or the DU 165-a may transmit the determination to an RU 170-a, and the RU 170-a may relay the determination to a UE 115-a. In some cases, the UE 115-a may transmit a report (e.g., a CSI report) to the RU 170-a that includes CSI that is generated based on estimated CLI between two UEs 115-a using precoded or unprecoded estimation and feedback in accordance with examples as described herein.

Figure 3:
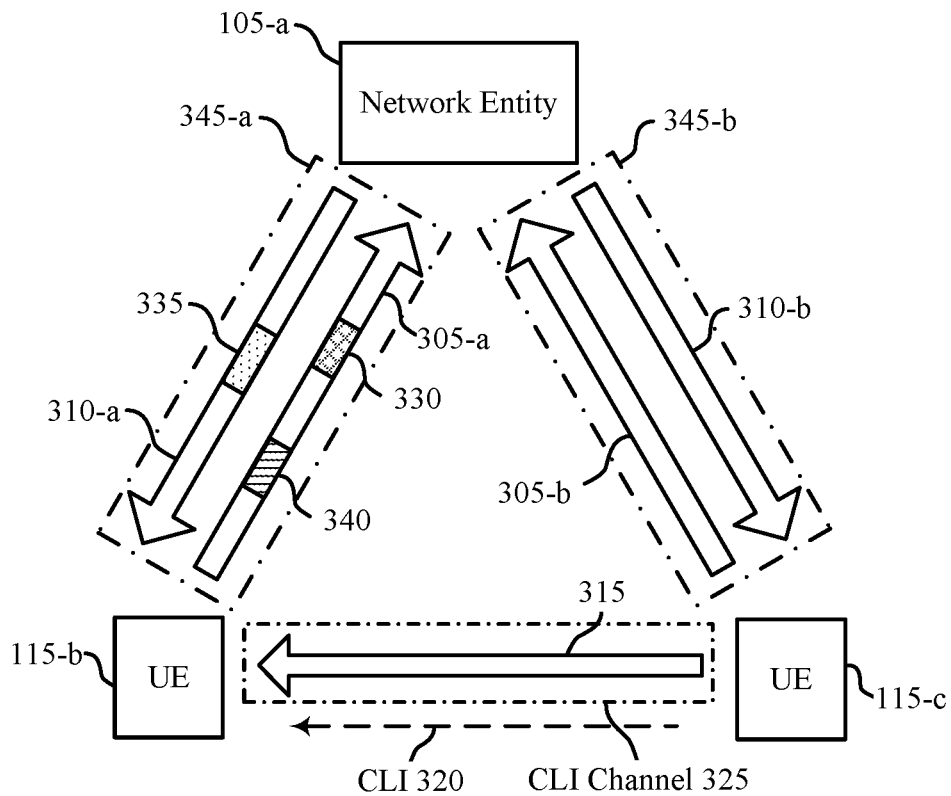
FIG. 3 illustrates an example of a wireless communications system that supports sensing and signaling of inter-UE CLI characteristics in accordance with one or more aspects of the present disclosure.

FIG. 3 illustrates an example of a wireless communications system 300 that supports sensing and signaling of inter-UE CLI characteristics in accordance with one or more aspects of the present disclosure. The wireless communications system 300 may implement or may be implemented by aspects of wireless communications system 100 as described with reference to FIG. 1. For example, the wireless communications system 300 may include a UE 115-b, a UE 115-c, and a network entity 105-a, which may be examples of the corresponding devices described herein, including with reference to FIGS. 1 and 2. In some examples, the UE 115-b may represent a victim UE, and the UE 115-c may represent an aggressor UE.

In some examples, the wireless communications system 300 may support an architecture including multiple transmissions and receptions. Additionally, or alternatively, the wireless communications system 300 may support TDD bands with no duplex enhancements in FDD bands, full duplex at the network entity 105-a, half duplex at the UEs 115, subband full duplex communications, in-band full duplex communications, or a combination thereof. In some cases, the wireless communications system 300 may support inter-gNB and inter-UE CLI handling as described herein, as well as handling of self-interference, inter-subband CLI, inter-in-band CLI, and inter-operator CLI. In some cases, the wireless communications system 300 may support FDD-like operations in TDD bands.

The wireless communications system 300 may support communication between the UEs 115 and the network entity 105-a. For example, the network entity 105-a may transmit downlink messages to the UEs 115 via one or more communication links 305, including communication links 305-a and 305-b. Similarly, the UEs 115 may transmit uplink messages to the network entity 105-a via one or more communications links 310, including communication links 310-a and 310-b. The communications links 305 and the communications links 310 may be examples of communication links 125 described herein, including with reference to FIG. 1. The wireless communications system 300 may also support communication between the UEs 115, for example, via a communication link 315.

The wireless communications system 300 may support full duplex communications between various combinations of the UEs 115 and the network entity 105-a and other network entities 105. For example, the network entity 105-a may concurrently communicate uplink messages and downlink messages with the UE 115-b, the UE 115-c, or both. Additionally, or alternatively, the UE 115-b and the UE 115-c may each concurrently communicate uplink messages and downlink messages with the network entity 105-a, another network entity 105, or both (e.g., in multi-RU communication scenarios). Other examples of full duplex communications may also be supported by the wireless communications system 300. In some examples, full duplex communications may be in-band full duplex communications or subband full duplex communications as described herein. In some cases, the UEs 115 may operate in half-duplex mode while the network entity 105-a (and other network entities 105) may operate in in-band full duplex mode or subband full duplex mode.

Devices in full duplex communications may experience self-interference, CLI, or both. For example, self-interference at a communication device may result from the concurrent communication of uplink messages and downlink messages. The UEs 115 and the network entity 105-a, when operating in a full duplex mode, may experience self-interference. CLI may result from concurrent communication of uplink messages and downlink messages between different communication devices. For example, in the example of FIG. 3, an uplink message transmitted by the UE 115-c may interfere with a downlink message that is concurrently received at the UE 115-b, thereby causing CLI 320 (e.g., inter-UE CLI). Similarly, a downlink message transmitted by the network entity 105-a may interfere with an uplink message that is concurrently received at another network entity 105 or a downlink message transmitted by the other network entity 105, and may thereby cause CLI at a UE 115 transmitting and communicating such messages with the network entities 105 (e.g., inter-gNB CLI). Other examples of CLI between communication devices are also possible.

In some examples, inter-UE CLI (e.g., the CLI 320) may be intra-cell CLI or inter-cell CLI. For example, if the UE 115-b and the UE 115-c are located within a same cell, the CLI 320 may include intra-cell CLI (e.g., CLI from UEs 115 in the same cell). Alternatively, if the UE 115-b and the UE 115-c are located in different cells (e.g., adjacent cells), the CLI 320 may include inter-cell CLI (e.g., CLI from UEs 115 in different cells). For example, in a dynamic TDD network, one cell may be configured with downlink communications while another cell may be configured with uplink communications, where UEs 115 within each cell may experience inter-cell CLI due to CLI between the cells. The UEs 115 may additionally experience inter-cell CLI from other network entities than the network entity 105-a (e.g., inter-gNB CLI). CLI such as the CLI 320 may degrade a signal quality of full duplex communications, for example, by adding additional noise to a channel between communication devices, thereby reducing a reliability of full duplex communications.

In some examples, CLI may exist within subband full duplex communications or within in-band full duplex communications. For example, in subband full duplex communications, the network entity 105-a may configure downlink transmissions to the UE 115-b in a frequency domain resource adjacent to the frequency domain resources configured for uplink transmissions of the UE 115-c. In some cases, the UE 115-c may transmit uplink transmissions in a second slot in the middle of the band, whereas the UE 115-b may receive downlink transmissions from the network entity 105-a in adjacent frequency resources. In some cases, uplink transmissions from the UE 115-c may cause CLI (e.g., intra-cell CLI) with downlink reception at the UE 115-b. For example, the CLI may be caused by energy leakage from timing or frequency unalignment between the two UEs 115. The CLI may also be caused by an automatic gain control (AGC) if the UE 115-b is driven by a downlink servicing cell signal and the CLI is strong enough to saturate the AGC. Additionally, or alternatively, for in-band full duplex communications, the uplink transmission from the UE 115-c may overlap with the downlink transmissions received at the UE 115-b, and may cause CLI between the two UEs 115.

The wireless communications system 300 may support techniques for selecting between methods for reducing impact of CLI on full duplex communications. For example, the wireless communications system 300 may switch or decide between using enhanced channel state feedback or using a precoded CLI-RS as described herein based on dynamics, or changing characteristics, of a CLI channel 325 between the UEs 115-b and 115-c. Based on whether the CLI channel 325 is fast-varying, slow-varying or non-varying, the network entity 105-a may determine to use unprecoded or precoded CLI channel estimation and feedback. In some examples, dynamics of the CLI channel 325 may indicate how fast the CLI channel 325 is changing or a pattern with which the CLI channel 325 is changing (e.g., semi-statically or dynamically).

In some cases, the CLI channel 325 may change based on a line of sight between the UEs 115, the network entity 105, or both. In some examples, a line of sight between the UEs 115 may change based on a change in orientation or positioning of the UE 115-b, the UE 115-c, or both, or based on an environmental blockage or occluding object (e.g., a large building between the two UEs 115). Dynamics of the CLI channel 325 may also be based on a change in precoding configurations at either UE 115 (e.g., using FR1) or a change in beam-forming configurations at either UE 115 (e.g., using FR2 or FR3), where a direction of CLI may change based on a beam change. Dynamics of the CLI channel 325 (such as strength of the CLI channel 325) may additionally be based on transmission power at the UEs 115 or the network entity 105-a (or other network entities 105), transmission timing, or other variables. In some examples, the network entity 105-a may be aware of the dynamics of the uplink channels (e.g., corresponding to the communication links 305) and downlink channels (e.g., corresponding to the communication links 310) for the UEs 115 based on feedback from the UEs 115. However, the network entity 105-a may be unaware of characteristics of the CLI channel 325, or of how the uplink and downlink channel characteristics impact the CLI channel 325. In some examples, dynamics may indicate whether the CLI channel 325 is fast-varying or slow-varying. For example, fast-varying may indicate a relatively fast change in channel characteristics (e.g., every 1 ms), and slow varying may indicate a slow change in characteristics of the channel (e.g., every 100 ms).

In some examples, the wireless communications system 300 may support different schemes for predicting or measuring the dynamics of the CLI channel 325. For example, the network entity 105-a may predict the dynamics of the CLI channel 325 using indirect sensing. In some cases, for example, the network entity 105-a may compare uplink and downlink parameters of the communication links 305 and 310 over time. In some examples, the network entity 105-*a* may include inner-loop link adaptation (e.g., based on modulation and coding scheme (MCS) from the UE 115-*b*, the UE 115-*c*, or both) and outer-loop link adaptation, with a goal of reducing an MCS to achieve a block error rate (BLER) target (e.g., BLER of 1% or 10%). In some examples, the network entity 105-*a* may compare inner-loop and outer-loop MCSs over time (or other scheduling parameters), and based on how an MCS changes over time, may determine that the BLER is higher. Additionally, or alternatively, the network entity 105-*a* may predict dynamics of the CLI channel 325 based on explicit CLI reports from the UE 115-*b* indicating a strength of the CLI channel 325 (e.g., CLI RSRP reports or CLI reference signal strength indicator (RSSI) reports). In some cases, the network entity 105-*a* may compile information about the CLI channel 325 to estimate how fast the CLI channel 325 is varying, or whether the CLI channel is fast-varying, slow-varying, or non-varying.

In some examples, the network entity 105-*a* may predict dynamics of the CLI channel 325 based on explicit sensing and assisting information from the UE 115-*b* (e.g., from a victim UE 115). For example, the UE 115-*b* may transmit a capability message 330 to the network entity 105-*a* (e.g., via UCI). The capability message 330 may indicate what processing and measuring the UE 115-*b* may handle as well as what payloads the UE 115-*b* may transmit to the network entity 105-*a*. For example, the capability message 330 may indicate whether the UE 115-*b* is capable of making a hard or soft decision of whether the CLI channel 325 is fast-varying or not. The capability message 330 may additionally indicate if the UE 115-*b* is capable of performing measurements (e.g., on the CLI channel 325) and providing assisting information based on the measurements to the network entity 105-*a* for making a hard or soft decision at the network entity 105-*a*. In some cases, the UE 115-*b* may indicate support for L2 signaling and transmitting MAC control elements (MAC-CE) for transmitting assisting information. The capability message may additionally indicate whether the UE 115-*b* is capable of performing processing at the UE 115-*b*, including ML compression of and transmission of the CLI channel. In some examples, the capability message 330 may explicitly indicate which of the schemes for determining dynamics of the CLI channel 325 the UE 115 may support (e.g., may indicate one or more indices corresponding to the schemes).

In some examples, the network entity 105-*b* may select a scheme for determining CLI channel dynamics (or channel characteristics) of the CLI channel 325 based on the capability message 330. For example, the UE 115-*b* may indicate support for one of the schemes. In some cases, the UE 115-*b* may indicate support for making a decision on a time-varying nature of the CLI channel 325 and transmitting an indication of the decision, according to one or more aspects described herein. Based on this indication in the capability message 330, the network entity 105-*a* may indicate to the UE 115-*b* to make the decision and to transmit the decision to the network entity 105-*a*. Similarly, the network entity 105-*a* may indicate to provide assisting information or perform split processing as described herein based on the capability message 330 indicating support for one of the schemes.

In some cases, the network entity 105-*a* may select a scheme for determining dynamics of the CLI channel 325 based on support for multiple schemes indicated by the UE 115-*b* in the capability message 330. For example, the UE 115-*b* may indicate support for making decisions at the UE, transmitting assistance information 340 for decisions at the network entity 105-*a*, and performing split processing with channel or information compression as described herein. The network entity 105-*b* may receive the capability message 330 indicating the multiple schemes, and may select a scheme based on a priority. For example, the network entity 105-*a* may be preconfigured with different priorities for each scheme, or the UE 115-*b* may indicate a priority for each scheme in the capability message 330. Additionally, or alternatively, the network entity may select to use one or more schemes at one or more time periods or for one or more time durations based on different characteristics of the CLI channel 325. In some examples, the UE 115-*b* and the network entity 105-*a* may implement a combination of the schemes described herein for making a time-varying decision.

In some examples, the network entity 105-*a* may transmit a scheme indication 335 (e.g., via control information such as RRC or DCI signaling) indicating a selected scheme for the UE 115-*b* to follow based on the capability message 330. In some cases, the scheme indication 335 may include an indication of a scheme preprogrammed at the UE 115-*b* (e.g., may include an index of a selected scheme), or may include one or more parameters and configurations defining the scheme. In response, the UE 115-*b* may transmit assistance information 340 or one or more indications to the network entity 105-*a* based on the scheme indication 335 as described herein. In some examples, the scheme indication 335 may indicate a combination of schemes, and the UE 115-*b* may respond by acting in accordance with the combination. In some examples, the UE 115-*b* may be preconfigured with the schemes, and may select a scheme without transmitting a capability message 330 or receiving a scheme indication 335. In some cases, the UE 115-*b* and the network entity 105-*a* may transmit one or more capability messages 330 and the scheme indications 335 based on updated information before performing processes and transmissions for a selected scheme. As described herein, the UE 115-*b* and the network entity 105-*a* may determine the dynamics of the CLI channel 325 based on additional factors contributing to the strength of the CLI channel 325 (e.g., transmission timing, misalignment of uplink and downlink transmissions, or change in line of sight). In some cases, the additional factors may not be indicated in an explicit strength indication (e.g., CLI RSRP reports, CLI RSSI reports).

In some examples, as described herein, the UE 115-*b* may determine a time-varying nature of the CLI channel 325. For example, the UE 115-*b* may perform one or more measurements of different characteristics of the CLI channel 325. Based on the one or more measurements and other characteristics of the CLI channel 325, the UE 115-*b* may determine whether the CLI channel 325 is fast-varying or not. This determination may be represented as a hard decision, and the UE 115-*b* may indicate the decision to the network entity 105-*a* using a one-bit indicator (e.g., within the assistance information 340, or included at the end of a CLI report). For example, a '1' may indicate that the CLI channel 325 is fast-varying, whereas a '0' may indicate that the CLI channel 325 is slow-varying or non-varying. Additionally, or alternatively, the UE 115-*b* may determine a likelihood of the CLI channel 325 being fast-varying. For instance, the UE 115-*b* may determine a decimal value between 0 and 1, where 0 may represent a 0% chance of the CLI channel 325 being fast-varying, and 1 may represent a 100% chance of the CLI channel 325 being fast-varying. Additionally, or alternatively, the decimal value may represent a metric of how fast-varying the CLI channel 325 is, where 0 may represent that the CLI channel 325 has no variation over time, and 1 may represent that the CLI channel 325 is different at every point in time. In some examples, the UE 115-*b* may indicate the decimal value to the network entity 105-*a* (e.g., within the assistance information 340).

By way of another example, the network entity 105-*a* may determine the time-varying nature of the CLI channel 325 based on measurements included by the UE 115-*b* in the assistance information 340. For example, the UE 115-*b* may perform the one or more measurements as described herein, and may transmit measured characteristics of the CLI channel 325 to the network entity 105-*b* in the assistance information 340 (e.g., via a MAC-CE). In some examples, the one or more measurements may include channel strength or other additional characteristics as described herein (e.g., channel strength, timing characteristics, or alignment characteristics). In some cases, the UE 115-*b* may estimate a coherence time of the CLI channel 325 based on multiple measurements of the CLI channel 325, and may include the estimated coherence time in the assistance information 340. In some cases, the UE 115-*b* may determine and include a metric related to coherence time which captures drastic variations of the CLI channel 325. For example, the metric may be based on larger changes between time periods at which the CLI channel 325 shows little change.

In some cases, the UE 115-*b* may measure and include second order statistics (e.g., variance), other characteristics or calculations (e.g., mean values), or explicit CLI channel feedback in the assistance information 340. In some cases, explicit CLI channel feedback may include channel impulse response, frequency domain channel estimation, RSRP, ISSR, or other measurements and characteristics. In some cases, the network entity 105-*a* may transmit an acknowledgment (e.g., an ACK) in response to receiving the assistance information 340. In some examples, the network entity 105-*a* may make the decision based off of implicit signaling or another method as described herein without using the assistance information 340.

By way of another example, the UE 115-*b* and the network entity 105-*a* may split processing, where the UE 115-*b* may transmit an indication of one or more intermediate metrics for the network entity 105-*a* to use in making a final decision on a time-varying nature of the CLI channel 325. For example, the UE 115-*b* may perform AI or ML assisted compression (e.g., using an auto-encoder) of the CLI channel 325. The UE 115-*b* may transmit the compressed channel to the network entity 105-*a*, and the network entity 105-*a* may decompress the channel and perform one or more measurements on the decompressed channel. Based on the decompressed channel, the one or more measurements, or both, the network entity 105-*a* may make a soft or hard decision of the time-varying nature of the CLI channel 325. Additionally, or alternatively, the UE 115-*b* may compress one or more measured characteristics (e.g., those included in the assistance information 340) for transmitting to the network entity 105-*a*. In some cases, the UE 115-*b* may additionally make one or more intermediate decisions based on the measurements, and may indicate the one or more intermediate decisions to the network entity 105-*a*.

In some examples, the network entity 105-*a* may make a final decision as to the time-varying nature of the CLI channel 325 based on decompressing measurements or a compressed channel, based on one or more indicated intermediate decisions, or both. In some cases, transmitting the compressed channel or compressed measurements may reduce overhead and size of transmissions compared to transmitting the uncompressed measured values in the assistance information 340. In some examples, the network entity 105-*a* and the UE 115-*b* may communicate specifics of the split processing before performing estimation of the CLI channel 325, including what processing happens at the UE 115-*b* and what processing happens at the network entity 105-*a*, as well as what data will be indicated to the network entity 105-*a* or to the UE 115-*b*. In some cases, the UE 115-*b* and the network entity 105-*a* may be preconfigured with specific procedures for the split processing scheme.

In some examples, the assistance information 340 and other indications transmitted by the UE 115-*b* may be sent via L1, L2, or L3 signaling based on a type of information included in the assistance information 340 or in other indications. For example, for smaller amounts of information (e.g., dynamic signaling), such as for transmitting a soft or hard decision made at the UE 115-*b*, the UE 115-*b* may use L1 signaling. In some examples, for larger messages (e.g., semi-static signaling), the UE 115-*b* may use L2 or L3 signaling. For example, the UE 115-*b* may use L2 or L3 signaling when transmitting assistance information 340 including coherence time, second order statics, and other measurements, or may use L2 or L3 signaling to transmit the compressed channel or compressed measurements. The UE 115-*b* may also transmit the intermediate decisions using L1, L2, or L3 signaling. In some examples, L1 signaling may include physical layer signaling. In some cases, L2 signaling may include MAC, RLC, and PDCP signaling. In some examples, L3 signaling may include RRC signaling. In some examples, L2 signaling (e.g., an uplink MAC-CE) may include better latency and dynamic properties compared to L3 signaling.

Figure 4:
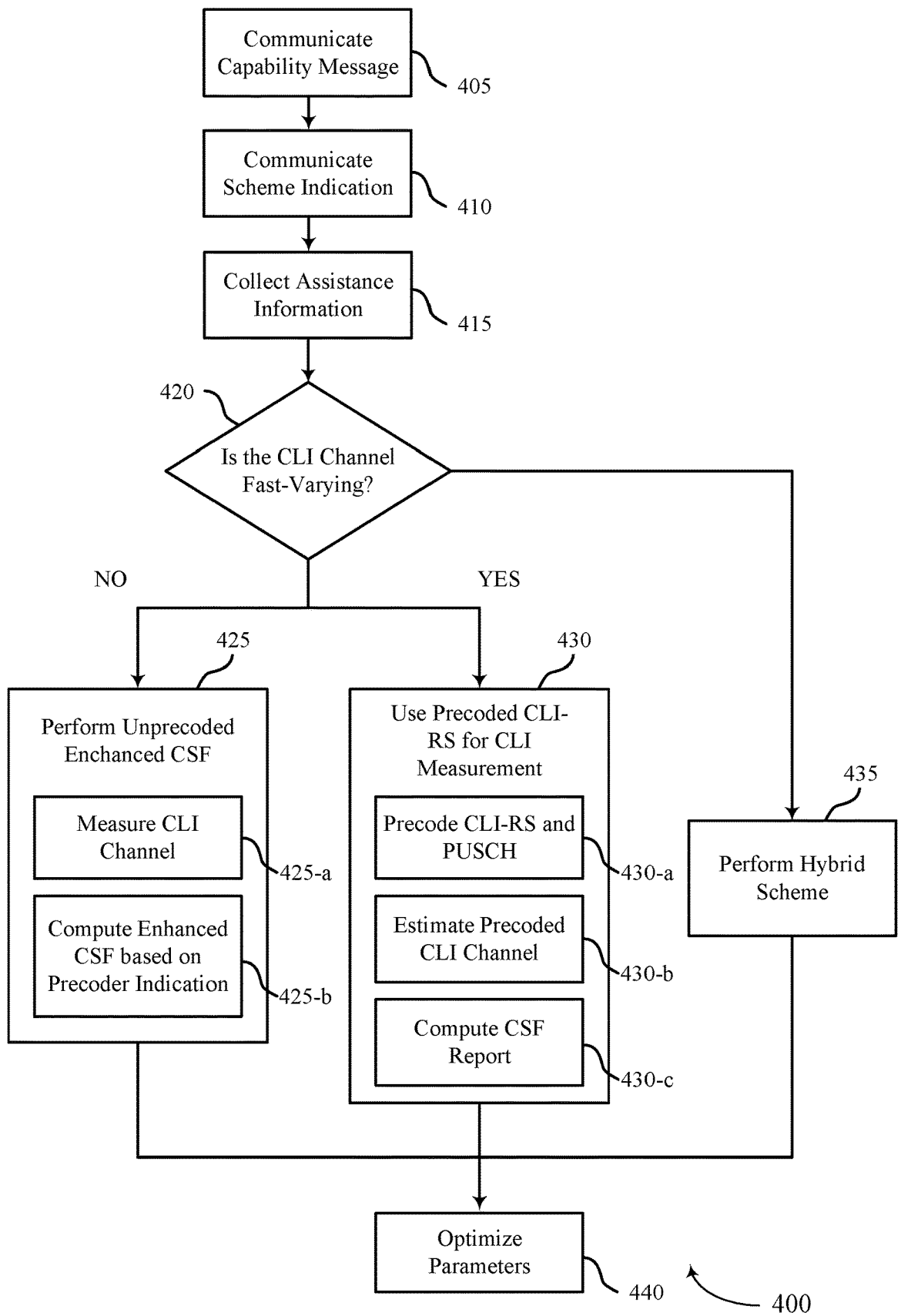
FIG. 4 illustrates an example of a method that supports sensing and signaling of inter-UE CLI characteristics in accordance with one or more aspects of the present disclosure.

Based on the soft or hard decision of the time-varying nature of the CLI channel 325 either indicated by the UE 115-*b* or determined by the network entity 105-*a* based on the assistance information 340, the network entity 105-*a* may decide on a scheme for mitigating the CLI 320 as described with greater detail with reference to FIG. 4. For example, the network entity 105-*a* may transmit configurations to the UE 115-*b* and the UE 115-*c* for unprecoded or precoded SRSs for CLI channel measurement, and may alter one or more parameters of channels 345 based on feedback from the UE 115-*b*, where the feedback may be based on the unprecoded or precoded SRSs. Channels 345 may include a channel 345-*a* and a channel 345-*b*. Additionally, or alternatively, the network entity 105-*a* may select a hybrid approach, and may configure a different SRS resource with a different periodicity for each scheme, where the periodicities may be based on feedback from the UEs 115. For example, the network entity 105-*a* may configure a first SRS resource with a low periodicity for estimating an unprecoded CLI channel 325, and may configure a second SRS resource with a higher periodicity for more frequent measurement based on a precoded CLI channel 325. In some examples, the network entity 105-*a* may configure scheduling parameters of the UEs 115 or parameters of the channels 345 based on feedback in an unprecoded scheme, a precoded scheme, or a hybrid scheme.

In some examples, the UE 115-*b* may estimate the CLI 320 based on one or more precoders, the CLI channel 325, and the channel 345-*a*. For example, a downlink signal that is received at the UE 115-*b* from the network entity 105-*a* concurrent with transmission of an uplink signal by the UE 115-*c* may be computed according to Equation 1 below:

$$y = HPx + H_{CLI}Tz + n \quad (1)$$

In Equation 1, y is the received downlink signal, H is the channel matrix corresponding to the channel 345-*a* (or 345-*b* if calculating from the aggressor UE perspective), P is a downlink precoding matrix (e.g., a precoding matrix indicated by a PMI) used by the network entity 105-a, x is the desired downlink signal, $H_{CLI}$ is the channel matrix corresponding to the CLI channel 325, T is an uplink precoding matrix (e.g., a precoding matrix indicated by a TPMI from the network entity 105-a) used by the UE 115-c, z is the uplink signal, and n is noise. In some examples, each scheme for estimating the CLI channel 325 may be based on the factors of Equation 1. For example, for unprecoded channel state feedback, the CLI 320 observed at the UE 115-b may be based on the effective CLI channel $H_{CLI}T$, a transmission power of the uplink signal, a rank of the uplink signal, or a combination thereof. Accordingly, based on estimating the unprecoded CLI channel 325 $H_{CLI}$ using a CLI-RS indicated by the UE 115-c and being indicated a candidate precoding matrix for an uplink message by the network entity 105-a, the UE 115-b may estimate the CLI 320 and consider the impact of the CLI 320 in generating CSI to report to the network entity 105-a as described with reference to FIG. 4. The UE 115-b may also consider a CSI-RS indicated by the network entity 105-a for the channel 345-a in generating the CSI. For precoded channel state feedback, the UE 115-b may calculate the effective CLI channel $H_{CLI}T$ based on a CLI-RS, transmitted by the UE 115-c, being precoded using the same precoder T as a PUSCH as described with reference to FIG. 4.

FIG. 4 illustrates an example of a method 400 that supports sensing and signaling of inter-UE CLI characteristics in accordance with one or more aspects of the present disclosure. Steps of method 400 may be performed, for example, at either the UEs 115 or the network entities 105 of FIGS. 1, 2, and 3 for a wireless communications system 100 or 300, or in a network architecture 200.

At block 405, the method 400 may include communicating a capability message. For example, a victim UE 115 (e.g., the UE 115-b depicted in FIG. 3) may transmit a capability message indicating one or more capabilities of the victim UE 115, including the capability to support one or more schemes for determining dynamics of a CLI channel as described with reference to FIG. 3. In some examples, the victim UE 115 may not support any functions at the victim UE 115 for helping decide dynamics of the CLI channel.

At block 410, the method 400 may include communicating a scheme indication. For example, a network entity 105 (e.g., the network entity 105-a depicted in FIG. 3) may select a scheme for determining dynamics of the CLI channel based on the capability message, and may transmit an indication of the selected scheme to the victim UE 115 as described with reference to FIG. 3. In some examples, the network entity 105 may transmit a message indicating a scheme for dynamics decisions at the victim UE 115, dynamics decisions at the network entity 105 based on assisting information transmitted from the victim UE 115, a split processing scheme, or a combination thereof. In some cases, the network entity 105 may transmit an indication of indirect sensing at the network entity 105, or of no determined scheme.

At block 415, the method 400 may include collecting assistance information. For example, as described with reference to FIG. 3, if the network entity 105 indicates for the victim UE 115 to determine dynamics of the CLI channel, the victim UE 115 may perform one or more measurements on the CLI channel for helping the UE 115 in the determination. If the network entity 105 indicates to determine dynamics of the CLI channel based on assisting information transmitted by the victim UE 115, the victim UE 115 may perform one or more measurements on the CLI channel and may transmit the measurements to the network entity 105. Additionally, or alternatively, the network entity 105 may indicate to perform split processing, where the victim UE 115 may transmit a compressed CLI channel or compressed measurements to the network entity 105.

At block 420, the method 400 may include determining whether the CLI channel is fast-varying. For example, as described with reference to FIG. 3, the victim UE 115 may determine if the CLI channel is fast-varying based on one or more measurements, and may transmit an indication of the determination to the network entity 105. By way of another example, the network entity 105 may determine if the CLI channel is fast-varying based on assistance information transmitted by the victim UE 115. Additionally, or alternatively, the victim UE 115 may perform intermediate processing including transmitting compressed channel information, measurements, or intermediate decisions to the network entity 105, where the network entity 105 may make a final decision for the dynamics of the CLI channel based on the compressed transmissions. In some examples, the determination made at the decision block 420 may be a hard or soft decision as described with reference to FIG. 3.

Based on the determination made at the decision block 420, the method may include one or more schemes for mitigating the CLI. For example, if the CLI channel is determined to not be fast-varying with a hard decision (e.g., =0), the method 400 may proceed to block 425. In some cases, the method 400 may transition to the block 425 based on a soft decision that the CLI channel is not fast-varying, where the soft decision may include a decimal value being less than a threshold value (e.g., <0.5 and slow-varying). Alternatively, if the CLI channel is determined to be fast-varying with a hard decision (e.g., =1), the method 400 may proceed to block 430. In some cases, the method 400 may transition to the block 430 based on a soft decision that the CLI channel is fast-varying, where the soft decision may include a soft decision decimal value being greater than the threshold value (e.g., >0.5 and fast-varying). By way of another example, the method 400 may transition to the block 425 based on the soft decision decimal value being less than the threshold value, or may transition to the block 430 based on the soft decision decimal value being greater than or equal to the threshold value.

In some examples, the method 400 may proceed to block 435 based on the dynamics of the CLI channel, or based on a configuration. For example, the network entity 105 may be configured to perform a hybrid scheme involving the steps of both the block 425 and the block 430 regardless of CLI dynamics. In some examples, the method 400 may transition to the block 435 based on a soft decision decimal value being equal to a threshold value (e.g., =0.5).

At block 425, the method 400 may include performing unprecoded enhanced CSI feedback, and may include blocks 425-a and 425-b. For example, based on the determination that the CLI channel is not fast-varying or is slow-varying (e.g., 0 hard decision or <0.5 soft decision), a network entity 105 may determine to perform enhanced channel state feedback at the UE 115 based on projected CLI, where an unprecoded CLI-RS may be used for estimating CLI channel and a TPMI precoder may be indicated in a channel state configuration. In some cases, the CLI channel may be non-varying or slow-varying based on a precoder changing more frequently than the CLI channel.

At block 425-a, the method 400 may include measuring a CLI channel. For example, the network entity 105 may configure (e.g., using RRC signaling) an aggressor UE 115

(e.g., the UE 115-c as described with reference to FIG. 3) to transmit a multi-port CLI-RS for sounding the CLI channel (e.g., a CLI sounding reference signal (CLI-SRS)), and may configure a victim UE 115 (e.g., the UE 115-b as described with reference to FIG. 3) with one or more CLI measurement resources (e.g., using RRC signaling). In some examples, the network entity 105 may transmit a configuration to the victim UE 115 for one or more multi-port zero power SRSs for measurement of the unprecoded CLI channel. The network entity 105 may then trigger the aggressor UE 115 to transmit the unprecoded CLI-RS to the victim UE 115. The network entity 105 may additionally transmit signaling (e.g., DCI) triggering the victim UE 115 to perform one or more measurements of the CLI channel using the one or more CLI measurement resources based on the CLI-RS. In some cases, the estimating the unprecoded CLI channel based on the CLI-RS may include estimating the unprecoded channel $H_{CLI}$ as described with respect to FIG. 3.

At block 425-b, the method 400 may include computing enhanced channel state feedback based on a precoder indication from the network entity 105. For example, the network entity 105 may transmit a precoder to the victim UE 115 (e.g., in a channel state feedback configuration). In some examples, the precoder may be an example of a TPMI. The network entity 105 may additionally indicate an RI corresponding to the TPMI to the victim UE 115. In some examples, the TPMI, RI, or both may indicate an interference hypothesis to use for computing channel state feedback. In some examples, the victim UE 115 may estimate the unprecoded CLI channel based on the unprecoded CLI-RS transmitted by the aggressor UE 115. In some cases, the victim UE 115 may perform one or more ML calculations (e.g., using a recurrent neural network (RNN)) to estimate the CLI channel. Based on the estimation of the CLI channel (e.g., assuming a given interference hypothesis), the indicated precoder, and an estimated channel between the victim UE 115 and the network entity 105, the victim UE 115 may select a channel state feedback computation. For example, the victim UE 115 may estimate CLI between the victim UE 115 and the aggressor UE 115 based on the estimated CLI channel and the precoder, and may determine the channel state feedback computation based on the CLI and the estimated channel between the victim UE 115 and the network entity 105. In some cases, the victim UE 115 may transmit an enhanced channel state feedback report to the network entity 105 based on the channel state feedback computation. For example, the victim UE 115 may transmit an enhanced CSI report to the network entity 105.

In some examples, an effective CLI channel may represent the combination of the unprecoded channel and the uplink precoder at the aggressor UE 115, and may be represented by $H_{CLI}T$ as described with reference to FIG. 3. Thus, the victim UE 115 may estimate the effective CLI channel based on the CLI-RS and the precoder (e.g., the TPMI, RI, or both) indicated by the network entity 105, and may accordingly estimate any CLI between the victim UE 115 and the aggressor UE 115. Based on the estimated CLI, and based on an estimated downlink channel H (e.g., the channel 345-a in FIG. 3) indicated in a CSI-RS transmitted by the network entity 105, the victim UE 115 may find one or more channel state feedback parameters. In some examples, the blocks 425-a and 425-b may be associated with periodic, semi-periodic, or aperiodic CLI-RS and CSI reporting.

At block 430, the method 400 may include using a precoded CLI-RS for CLI measurement, and may include blocks 430-a, 430-b, and 430-c. For example, based on the determination that a CLI channel is fast-varying (e.g., 1 hard decision or >0.5 soft decision), a network entity 105 may determine to perform precoded channel state feedback, including configuring a precoded CLI-RS with a same precoder as a PUSCH transmission to mimic a future PUSCH transmission. A victim UE 115 may thus estimate the CLI channel based on the precoded CLI-RS. In some cases, the network entity 105 may determine to use a precoded CLI-RS based on the fast-varying nature of the unprecoded CLI channel, where otherwise estimating the unprecoded CLI channel may be inaccurate due to the CLI channel changing frequently.

At block 430-a, the method 400 may include precoding a CLI-RS and PUSCH. For example, the network entity 105 may configure an aggressor UE 115 with a multi-port CLI-RS and a PUSCH, where both may be precoded using the same precoder. In some cases, the network entity 105 may indicate to the UE 115 to precode a multi-port CLI-RS based on an upcoming PUSCH using the same precoder. By using the same precoder, the CLI-RS and the PUSCH may be linked, and the CLI channel between the aggressor UE 115 and the victim UE 115 may accordingly mimic the future PUSCH transmission. In some examples, the aggressor UE 115 may transmit the precoded CLI-RS to the victim UE 115 for use in estimating the CLI channel.

At block 430-b, the method 400 may include estimating the precoded CLI channel. For example, the victim UE 115 may use the precoded CLI-RS to estimate the CLI channel. In some examples, an effective CLI channel may represent the combination of the channel itself and the uplink precoder, or CLI-RS, at the aggressor UE 115, and may be represented by $H_{CLI}T$ as described with reference to FIG. 3. The victim UE 115 may thus estimate the effective CLI channel based on the CLI-RS, where the CLI-RS may account for both the channel characteristics and the precoder for the effective channel due to already being precoded. In some examples, the network entity 105 may transmit a configuration to the victim UE 115 for one or more multi-port zero power SRSs for measurement of the precoded CLI channel. In some examples, the victim UE 115 may estimate any CLI between the victim UE 115 and the aggressor UE 115 based on the effective CLI channel. In some cases, the victim UE 115 may use the one or more zero power SRSs for deriving a CLI hypothesis for use in determining one or more channel state feedback parameters.

At block 430-c, the method 400 may include computing a channel state feedback report. In some examples, the victim UE 115 may compute feedback, including a CLI report, CSI report, or an enhanced CSI report, based on the estimation of the effective CLI channel (and associated CLI). In some cases, the victim UE 115 may find the channel state feedback parameters based on the estimated CLI and an estimated downlink channel H (e.g., the channel 345-a in FIG. 3). In some cases, the downlink channel H may be estimated based on a CSI-RS transmitted by the network entity 105. In some cases, the estimation may be performed based on one or more MIL, processes (e.g., using an RNN), as described herein. In some examples, the victim UE 115 may transmit the channel state feedback (e.g., an enhanced CSI report) to the network entity 105 after computing the feedback. In some examples, the blocks 430-a, 430-b, and 430-c may involve periodic, semi-periodic, or aperiodic CLI-RS and CSI reporting, as well as other forms of PUSCH communications (e.g., configured grant (CG) PUSCH).

At block 435, the method 400 may include using hybrid scheme including aspects of both blocks 425 and 430. For example, based on the determination of the CLI channel dynamics (e.g., =0.5 soft decimal decision), or based on a configuration, a network entity 105 may determine to perform a hybrid scheme, including implementing both precoded and unprecoded feedback.

In some examples, a network entity 105 may decide to alternate between the two schemes based on different periodicities. For example, the network entity 105 may configure two SRS resources with different periodicities based on feedback from a victim UE 115. In some cases, the network entity 105 may configure a first SRS resource with a low periodicity, and may instruct the victim UE 115 to measure the unprecoded CLI channel at the low periodicity using the first SRS resource. In some cases, the network entity 105 may configure a second SRS resource with a high periodicity, and may instruct the victim UE 115 to perform more frequent channel estimation based on precoded CLI-RSs (e.g., from an aggressor UE 115). In some cases, the precoded CLI-RSs may be transmitted in an aperiodic manner or on-demand. Additionally, or alternatively, the network entity 105 may configure the first SRS resource with a high periodicity for unprecoded channel estimation and the second SRS resource with a low periodicity for precoded channel estimation. In some examples, the network entity 105 may configure the two SRS resources with a same periodicity, and may alternate between performing unprecoded and precoded estimation and feedback.

In some examples, the network entity 105 may determine to use the hybrid scheme based on one or more other characteristics. For example, the network entity 105 may determine that enhanced unprecoded channel state feedback may present advantages at one or more first time periods, and that precoded CLI-RS may present advantages during one or more second time periods. In some cases, the network entity 105 may predict that the CLI channel will be slow-varying based on a dominant aggressor UE 115 during one or more first time periods, and may determine to employ enhanced unprecoded channel state feedback during the one or more first time periods. In some examples, the network entity 105 may predict that the CSI channel will be fast-varying during one or more second time periods, and may determine to employ precoded CLI-RS during the one or more second time periods. In some cases, the network entity 105 may configure the periodicities of the two SRS resources based on the CLI channel predictions.

At block 440, the method 400 may include optimizing one or more parameters. For example, based on CLI feedback from a victim UE 115 as described in blocks 425, 430, and 435, a network entity 105 may optimize one or more parameters of a network. In some cases, the network entity 105 may reconfigure one or more parameters at the network entity 105 to mitigate CLI between a victim UE 115 and an aggressor UE 115. Additionally, or alternatively, the network entity may reconfigure one or more parameters at the victim UE 115 or the aggressor UE 115 via one or more RRC, DCI, or other configurations. In some cases, the one or more parameters at the network entity 105 or the UEs 115 may include one or more scheduling parameters for physical downlink shared channel (PDSCH) communications, PUSCH communications, or other processes, or one or more other transmission or reception parameters for uplink or downlink communications. In some examples, the method 400 may include estimating CLI channels between the network entity 105 and another network entity 105, CLI channels between the UEs 115 and the network entity 105 or another network entity 105, or any other CLI channels within a communications network. In some examples, the network entity 105 may base optimizing parameters off of interference power and interference rank of the CLI indicated by the victim UE 115 (e.g., in a CLI report).

Figure 5:
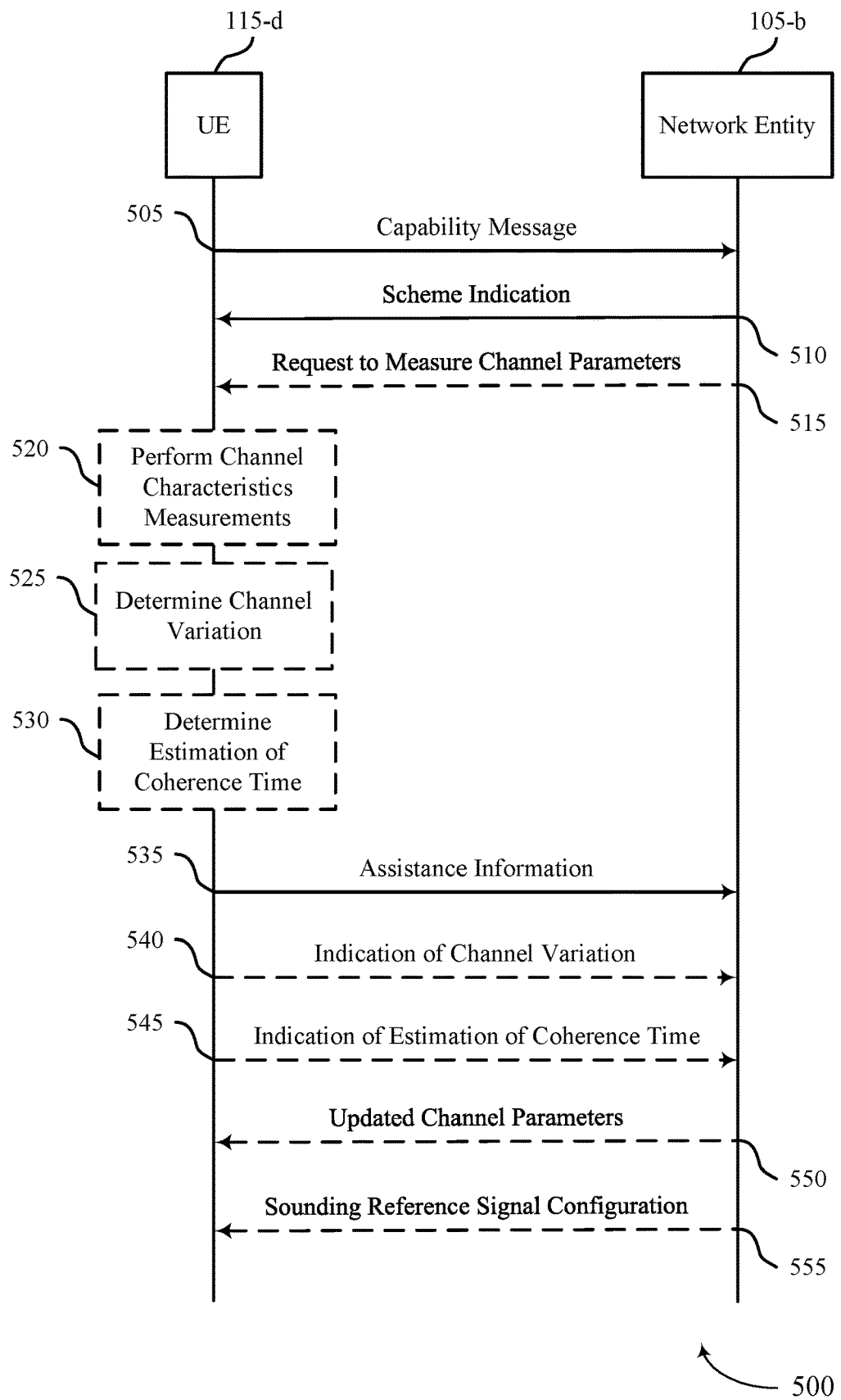
FIG. 5 illustrates an example of a process flow that supports sensing and signaling of inter-UE CLI characteristics in accordance with one or more aspects of the present disclosure.

FIG. 5 illustrates an example of a process flow 500 that supports sensing and signaling of inter-UE CLI characteristics in accordance with one or more aspects of the present disclosure. The process flow 500 may be implemented by aspects of the wireless communications systems 100 or 300, or by aspects of the network architecture 200, or the flowchart diagram for the method 400. For example, the process flow 500 may illustrate communication between a UE 115-d and a network entity 105-b, which may be examples of corresponding devices described herein, including with reference to FIGS. 1 through 4.

In the following description of the process flow 500, the operations may be performed in a different order than the order shown. Specific operations also may be left out of the process flow 500, or other operations may be added to the process flow 500. Further, although some operations or signaling may be shown to occur at different times for discussion purposes, these operations may actually occur at the same time.

At 505, the UE 115-d may transmit, and the network entity 105-b may receive, capability information indicating a capability of the UE 115-d to support one or more schemes for determining characteristics of an inter-UE CLI channel. At 510, the network entity 105-b may transmit, and the UE 115-d may receive, based on the capability information, an indication of a selected scheme of the one or more schemes for determining the characteristics of the inter-UE CLI channel.

At 515, the network entity 105-b may optionally transmit, and the UE 115-d may optionally receive, a request to measure the characteristics of the inter-UE CLI channel. At 520, the UE 115-d may optionally perform a set of multiple measurements of the characteristics of the inter-UE CLI channel in accordance with the selected scheme. In some examples, the UE 115-d may perform the set of multiple measurements of the characteristics of the inter-UE CLI channel based on receiving the request to measure the characteristics.

At 525, the UE 115-d may optionally determine a channel variation of the inter-UE CLI channel. In some cases, the UE 115-d may determine the channel variation of the inter-UE CLI channel based on a rate of change of the characteristics of the inter-UE CLI channel. In some cases, the UE 115-d may determine the rate of change of the characteristics of the inter-UE CLI channel before determining the channel variation, and may determine the rate of change based on sensing the inter-UE CLI channel.

At 530, the UE 115-d may optionally determine an estimation of coherence time associated with a variation of the inter-UE CLI channel based on the plurality of measurements of the characteristics of the inter-UE CLI channel.

At 535, the UE 115-d may transmit, and the network entity 105-b may receive, assistance information in accordance with the selected scheme, the assistance information pertaining to the inter-UE CLI channel. In some examples, the assistance information may include the set of multiple measurements of the characteristics of the inter-UE CLI channel. In some cases, the assistance information may include at least one of a CLI report, an RSRP report, a CLI channel impulse response, frequency domain channel information, or a combination thereof.

At 540, the UE 115-d may optionally transmit, and the network entity 105-b may optionally receive, an indication of the channel variation of the inter-UE CLI channel. In some cases, the indication of the channel variation may include an indication of a likelihood that the inter-UE CLI channel is varying over a time period. In some examples, the indication of the likelihood that the inter-UE CLI channel is varying may include a value from a range of value indicating a degree with which the inter-UE CLI channel is varying. In some cases, the indication of the likelihood that the inter-UE CLI channel is varying may be a one-bit indication.

At 545, the UE 115-*d* may optionally transmit, and the network entity 105-*b* may optionally receive, an indication of the estimation of coherence time. At 550, the network entity 105-*b* may optionally transmit, and the UE 115-*d* may optionally receive, one or more updated channel parameters in response to transmitting the assistance information.

At 555, the network entity 105-*b* may optionally transmit, and the UE 115-*d* may optionally receive, a configuration for a first set of SRSs associated with a first periodicity and a configuration for a second set of SRSs associated with a second periodicity, where the first set of SRSs and the second set of SRSs are determined based on the assistance information. In some examples, the network entity 105-*b* may also transmit, and the UE 115-*d* may also receive, a configuration for a set of precoded SRSs for inter-UE CLI channel measurement or a set of unprecoded SRSs for inter-UE CLI channel measurement or both.

Figure 6:
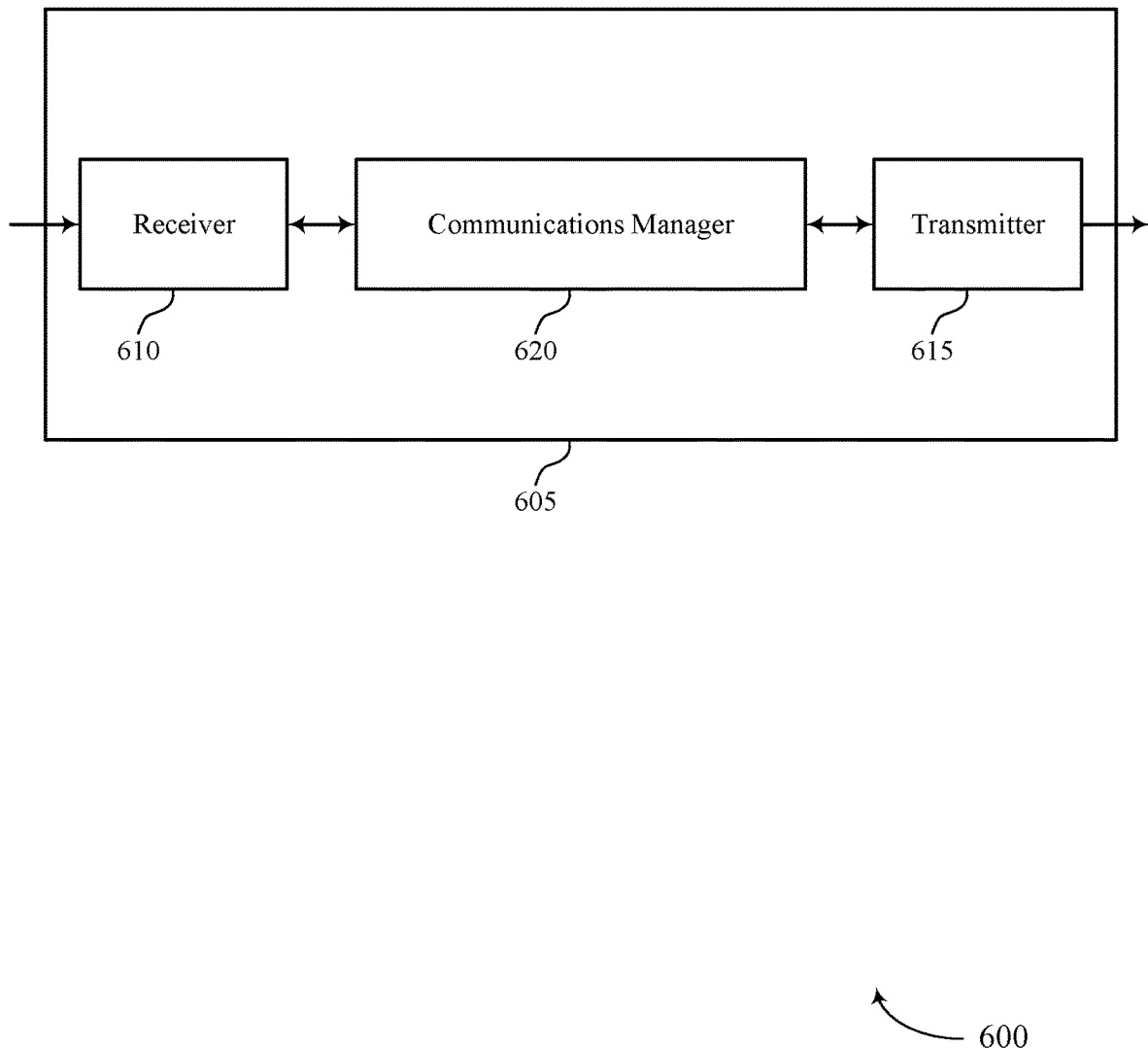
FIGS. 6 and 7 show block diagrams of devices that support sensing and signaling of inter-UE CLI characteristics in accordance with one or more aspects of the present disclosure.

FIG. 6 shows a block diagram 600 of a device 605 that supports sensing and signaling of inter-UE CLI characteristics in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sensing and signaling of inter-UE CLI characteristics). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sensing and signaling of inter-UE CLI characteristics). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of sensing and signaling of inter-UE CLI characteristics as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for transmitting, to a network entity, capability information indicating a capability of the UE to support one or more schemes for determining characteristics of an inter-UE CLI channel over a time period. The communications manager 620 may be configured as or otherwise support a means for receiving, from the network entity and based on the capability information, an indication of a selected scheme of the one or more schemes for determining the characteristics of the inter-UE CLI channel. The communications manager 620 may be configured as or otherwise support a means for transmitting, to the network entity, assistance information in accordance with the selected scheme, the assistance information pertaining to the inter-UE CLI channel.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources.

Figure 7:
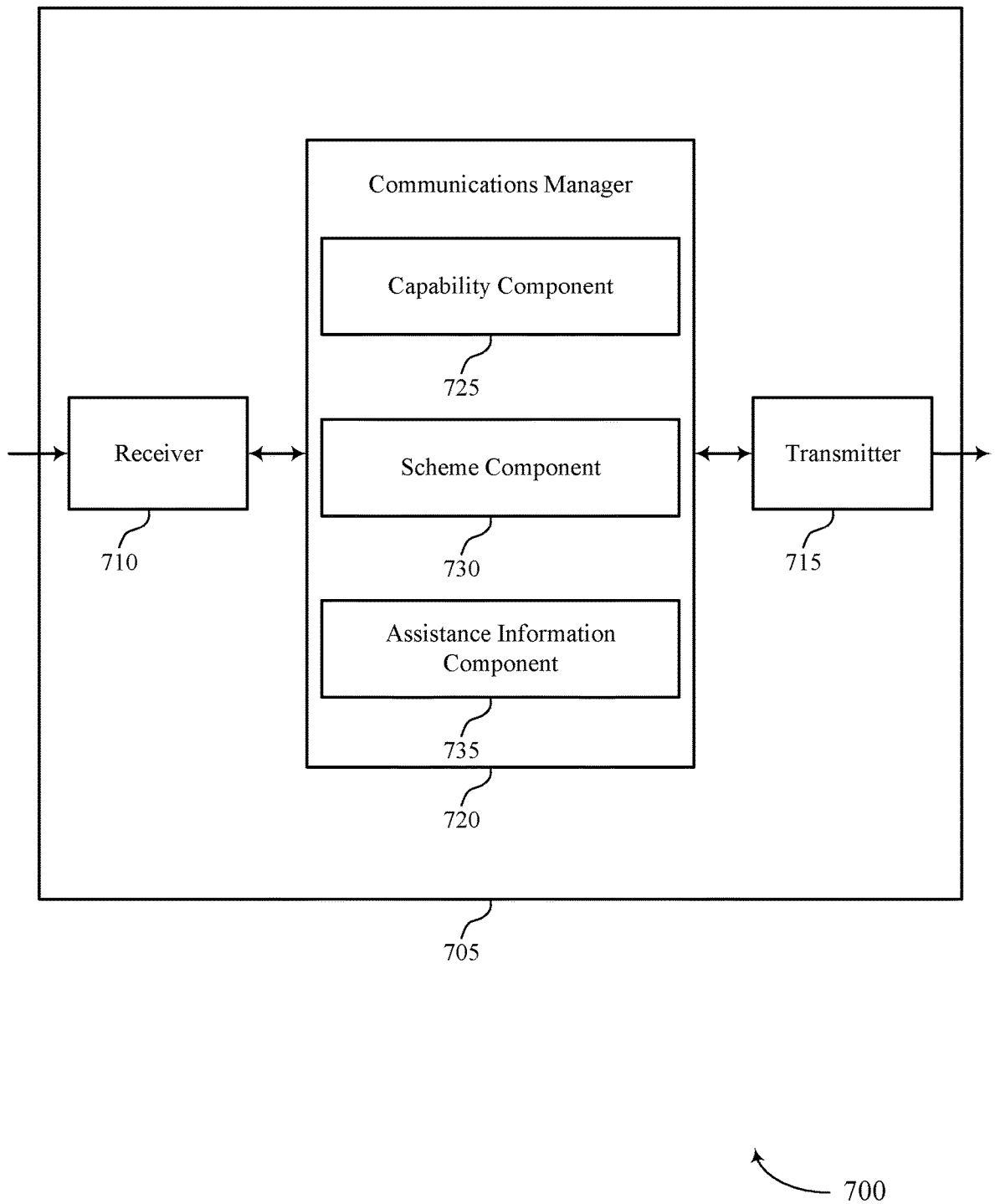

FIG. 7 shows a block diagram 700 of a device 705 that supports sensing and signaling of inter-UE CLI characteristics in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sensing and signaling of inter-UE CLI characteristics). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sensing and signaling of inter-UE CLI characteristics). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of sensing and signaling of inter-UE CLI characteristics as described herein. For example, the communications manager 720 may include a capability component 725, a scheme component 730, an assistance information component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The capability component 725 may be configured as or otherwise support a means for transmitting, to a network entity, capability information indicating a capability of the UE to support one or more schemes for determining characteristics of an inter-UE CLI channel over a time period. The scheme component 730 may be configured as or otherwise support a means for receiving, from the network entity and based on the capability information, an indication of a selected scheme of the one or more schemes for determining the characteristics of the inter-UE CLI channel. The assistance information component 735 may be configured as or otherwise support a means for transmitting, to the network entity, assistance information in accordance with the selected scheme, the assistance information pertaining to the inter-UE CLI channel.

Figure 8:
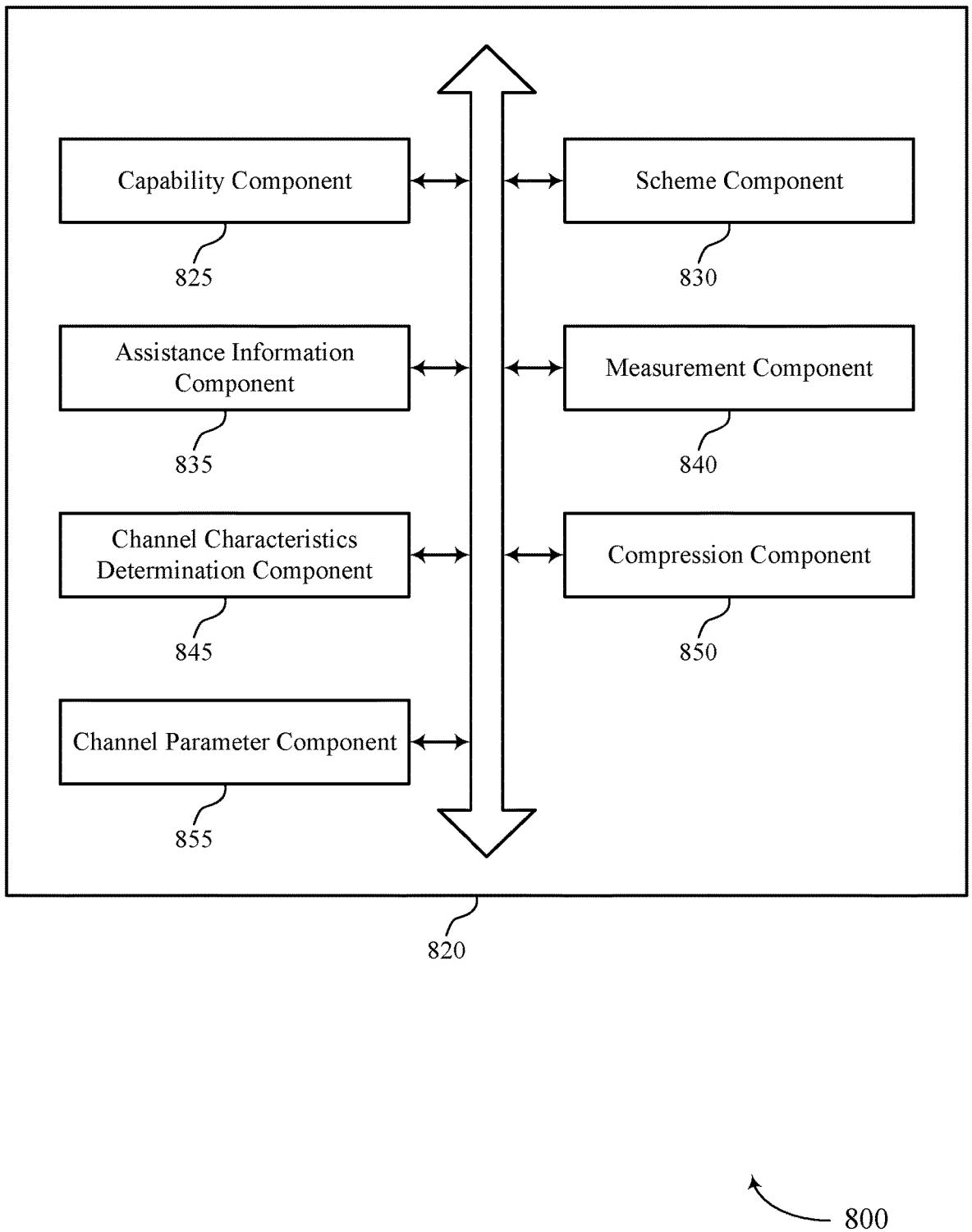
FIG. 8 shows a block diagram of a communications manager that supports sensing and signaling of inter-UE CLI characteristics in accordance with one or more aspects of the present disclosure.

FIG. 8 shows a block diagram 800 of a communications manager 820 that supports sensing and signaling of inter-UE CLI characteristics in accordance with one or more aspects of the present disclosure. The communications manager 820 may be an example of aspects of a communications manager 620, a communications manager 720, or both, as described herein. The communications manager 820, or various components thereof, may be an example of means for performing various aspects of sensing and signaling of inter-UE CLI characteristics as described herein. For example, the communications manager 820 may include a capability component 825, a scheme component 830, an assistance information component 835, a measurement component 840, a channel characteristics determination component 845, a compression component 850, a channel parameter component 855, or any combination thereof. Each of these components may communicate, directly or indirectly, with one another (e.g., via one or more buses).

The communications manager 820 may support wireless communication at a UE in accordance with examples as disclosed herein. The capability component 825 may be configured as or otherwise support a means for transmitting, to a network entity, capability information indicating a capability of the UE to support one or more schemes for determining characteristics of an inter-UE CLI channel over a time period. The scheme component 830 may be configured as or otherwise support a means for receiving, from the network entity and based on the capability information, an indication of a selected scheme of the one or more schemes for determining the characteristics of the inter-UE CLI channel. The assistance information component 835 may be configured as or otherwise support a means for transmitting, to the network entity, assistance information in accordance with the selected scheme, the assistance information pertaining to the inter-UE CLI channel.

In some examples, the measurement component 840 may be configured as or otherwise support a means for performing a set of multiple measurements of the characteristics of the inter-UE CLI channel in accordance with the selected scheme, where the assistance information includes the set of multiple measurements of the characteristics of the inter-UE CLI channel.

In some examples, the channel characteristics determination component 845 may be configured as or otherwise support a means for determining a rate of change of the characteristics of the inter-UE CLI channel based on sensing the inter-UE CLI channel. In some examples, the channel characteristics determination component 845 may be configured as or otherwise support a means for determining a channel variation in time of the inter-UE CLI channel based on the rate of change of the characteristics of the inter-UE CLI channel. In some examples, the assistance information component 835 may be configured as or otherwise support a means for transmitting an indication of the channel variation in time of the inter-UE CLI channel.

In some examples, to support transmitting the indication of the channel variation, the assistance information component 835 may be configured as or otherwise support a means for transmitting an indication of a likelihood that the inter-UE CLI channel is varying over a time period.

In some examples, the indication of the likelihood that the inter-UE CLI channel is varying includes a value from a range of values indicating a degree with which the inter-UE CLI channel is varying. In some examples, the indication of the likelihood that the inter-UE CLI channel is varying includes a one-bit indication.

In some examples, the measurement component 840 may be configured as or otherwise support a means for performing a set of multiple measurements of the characteristics of the inter-UE CLI channel in accordance with the selected scheme. In some examples, the channel characteristics determination component 845 may be configured as or otherwise support a means for determining, based on the set of multiple measurements of the characteristics of the inter-UE CLI channel, at least one of an estimation of coherence time associated with a variation of the inter-UE CLI channel, a coherence time metric, one or more statistics related to the inter-UE CLI channel, an inter-UE CLI channel feedback, or a combination thereof. In some examples, the assistance information component 835 may be configured as or otherwise support a means for transmitting, to the network entity, an indication of at least one of the estimation of coherence time, the coherence time metric, the one or more statistics related to the inter-UE CLI channel, the inter-UE CLI channel feedback, or a combination thereof.

In some examples, the compression component 850 may be configured as or otherwise support a means for compressing the assistance information prior to transmitting the assistance information to the network entity, where compressing the assistance information includes compressing the inter-UE CLI channel using an auto-encoder.

In some examples, the channel parameter component 855 may be configured as or otherwise support a means for receiving, from the network entity, one or more updated channel parameters in response to transmitting the assistance information.

In some examples, the measurement component 840 may be configured as or otherwise support a means for receiving, from the network entity, a request to measure the characteristics of the inter-UE CLI channel. In some examples, the measurement component 840 may be configured as or otherwise support a means for performing a set of multiple measurements of the characteristics of the inter-UE CLI channel based on receiving the request.

In some examples, the channel parameter component 855 may be configured as or otherwise support a means for receiving, from the network entity, a configuration for a first set of SRSs associated with a first periodicity and a configuration for a second set of SRSs associated with a second periodicity, where the first set of SRSs and the second set of SRSs are determined based on the assistance information.

In some examples, the channel parameter component 855 may be configured as or otherwise support a means for receiving, from the network entity, a configuration for a set of precoded SRSs for inter-UE CLI channel measurement or a set of unprecoded SRSs for inter-UE CLI channel measurement or both.

In some examples, the assistance information includes at least one of a CLI report, an RSRP report, a CLI channel impulse response, frequency domain channel information, or a combination thereof.

Figure 9:
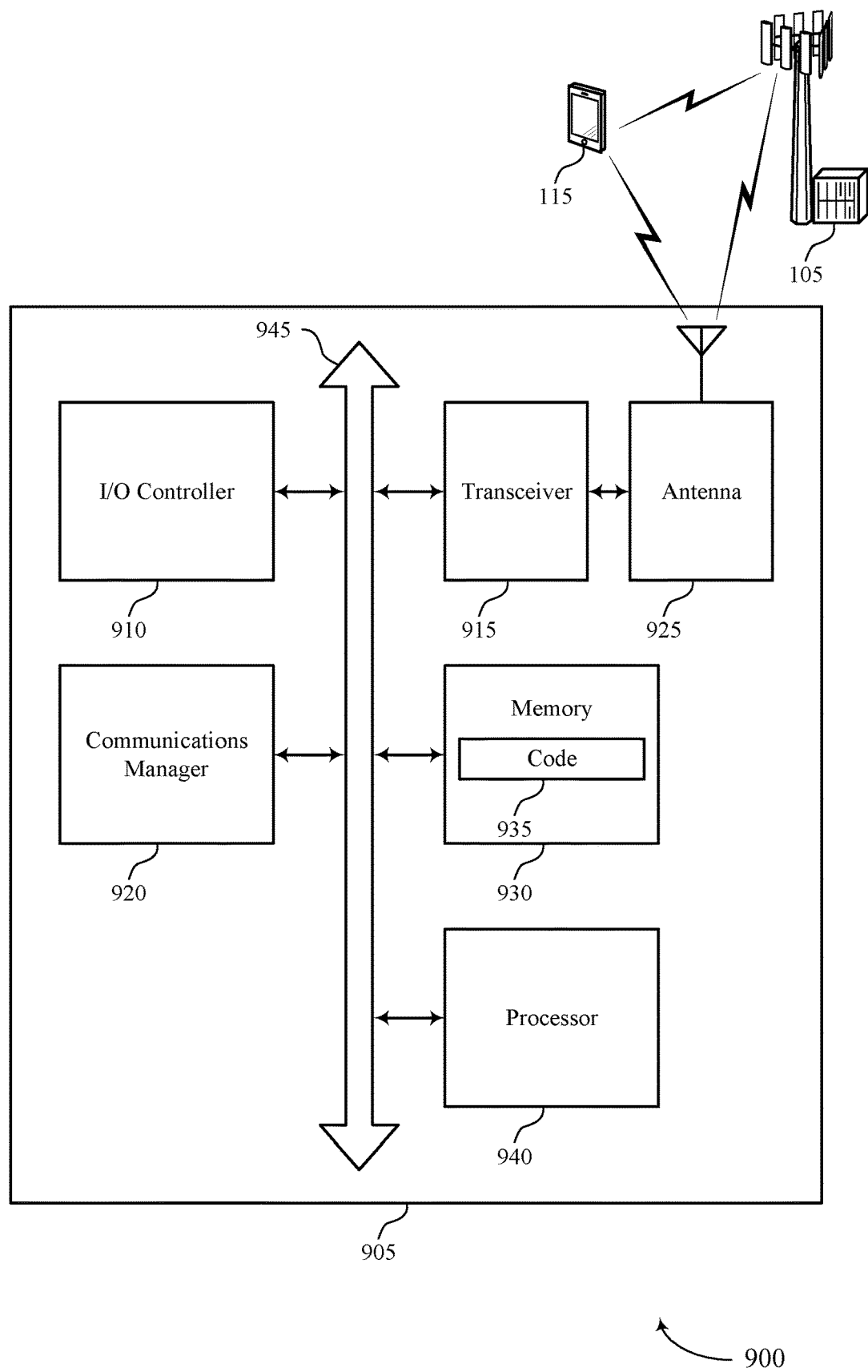
FIG. 9 shows a diagram of a system including a device that supports sensing and signaling of inter-UE CLI characteristics in accordance with one or more aspects of the present disclosure.

FIG. 9 shows a diagram of a system 900 including a device 905 that supports sensing and signaling of inter-UE CLI characteristics in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting sensing and signaling of inter-UE CLI characteristics). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting, to a network entity, capability information indicating a capability of the UE to support one or more schemes for determining characteristics of an inter-UE CLI channel over a time period. The communications manager 920 may be configured as or otherwise support a means for receiving, from the network entity and based on the capability information, an indication of a selected scheme of the one or more schemes for determining the characteristics of the inter-UE CLI channel. The communications manager 920 may be configured as or otherwise support a means for transmitting, to the network entity, assistance information in accordance with the selected scheme, the assistance information pertaining to the inter-UE CLI channel.

By including or configuring the communications manager 920 in accordance with examples as described herein, the device 905 may support techniques for improved communication reliability, reduced latency, improved user experience related to reduced processing, reduced power consumption, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of sensing and signaling of inter-UE CLI characteristics as described herein, or the processor 940 and the memory 930 may be otherwise configured to perform or support such operations.

Figure 10:
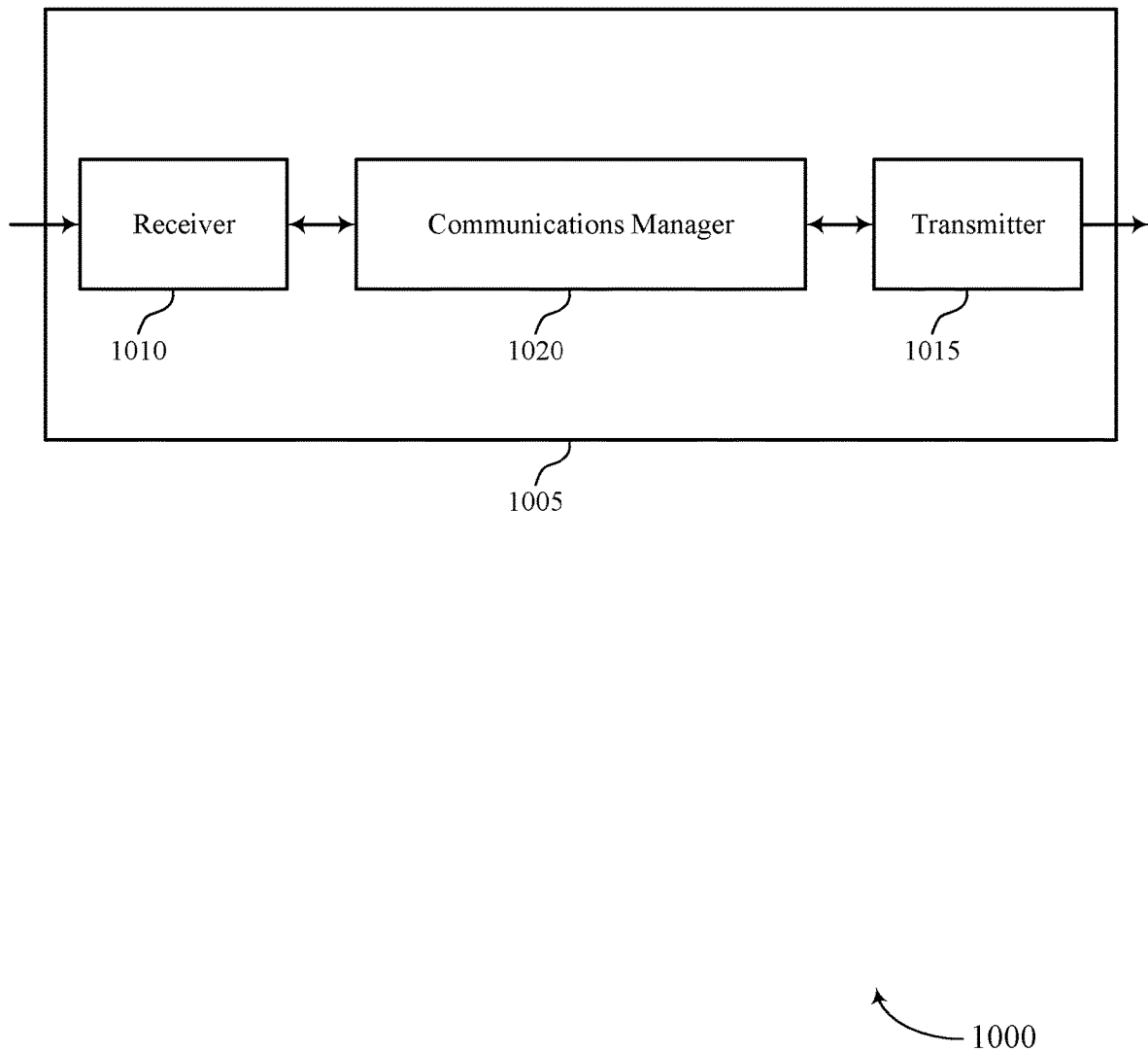
FIGS. 10 and 11 show block diagrams of devices that support sensing and signaling of inter-UE CLI characteristics in accordance with one or more aspects of the present disclosure.

FIG. 10 shows a block diagram 1000 of a device 1005 that supports sensing and signaling of inter-UE CLI characteristics in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of sensing and signaling of inter-UE CLI characteristics as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software) executed by a processor. If implemented in code executed by a processor, the functions of the communications manager 1020, the receiver 1010, the transmitter 1015, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for receiving, from a UE, capability information indicating a capability of the UE to support one or more schemes for determining characteristics of an inter-UE CLI channel over a time period. The communications manager 1020 may be configured as or otherwise support a means for transmitting, to the UE and based on the capability information, an indication of a selected scheme of the one or more schemes for determining the characteristics of the inter-UE CLI channel. The communications manager 1020 may be configured as or otherwise support a means for receiving, from the UE, assistance information in accordance with the selected scheme, the assistance information pertaining to the inter-UE CLI channel.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, and more efficient utilization of communication resources.

Figure 11:
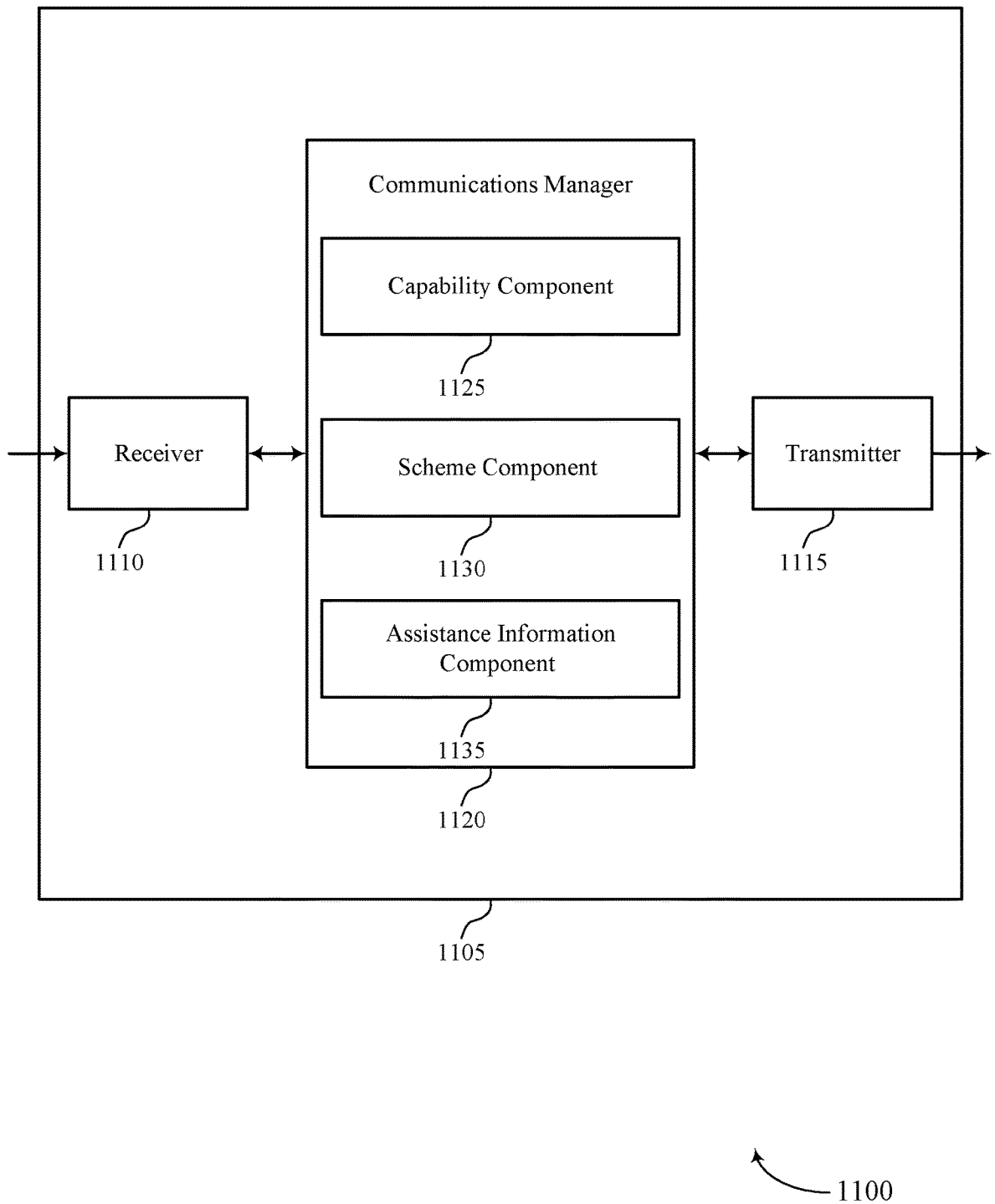

FIG. 11 shows a block diagram 1100 of a device 1105 that supports sensing and signaling of inter-UE CLI characteristics in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of sensing and signaling of inter-UE CLI characteristics as described herein. For example, the communications manager 1120 may include a capability component 1125, a scheme component 1130, an assistance information component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The capability component 1125 may be configured as or otherwise support a means for receiving, from a UE, capability information indicating a capability of the UE to support one or more schemes for determining characteristics of an inter-UE CLI channel over a time period. The scheme component 1130 may be configured as or otherwise support a means for transmitting, to the UE and based on the capability information, an indication of a selected scheme of the one or more schemes for determining the characteristics of the inter-UE CLI channel. The assistance information component 1135 may be configured as or otherwise support a means for receiving, from the UE, assistance information in accordance with the selected scheme, the assistance information pertaining to the inter-UE CLI channel.

Figure 12:
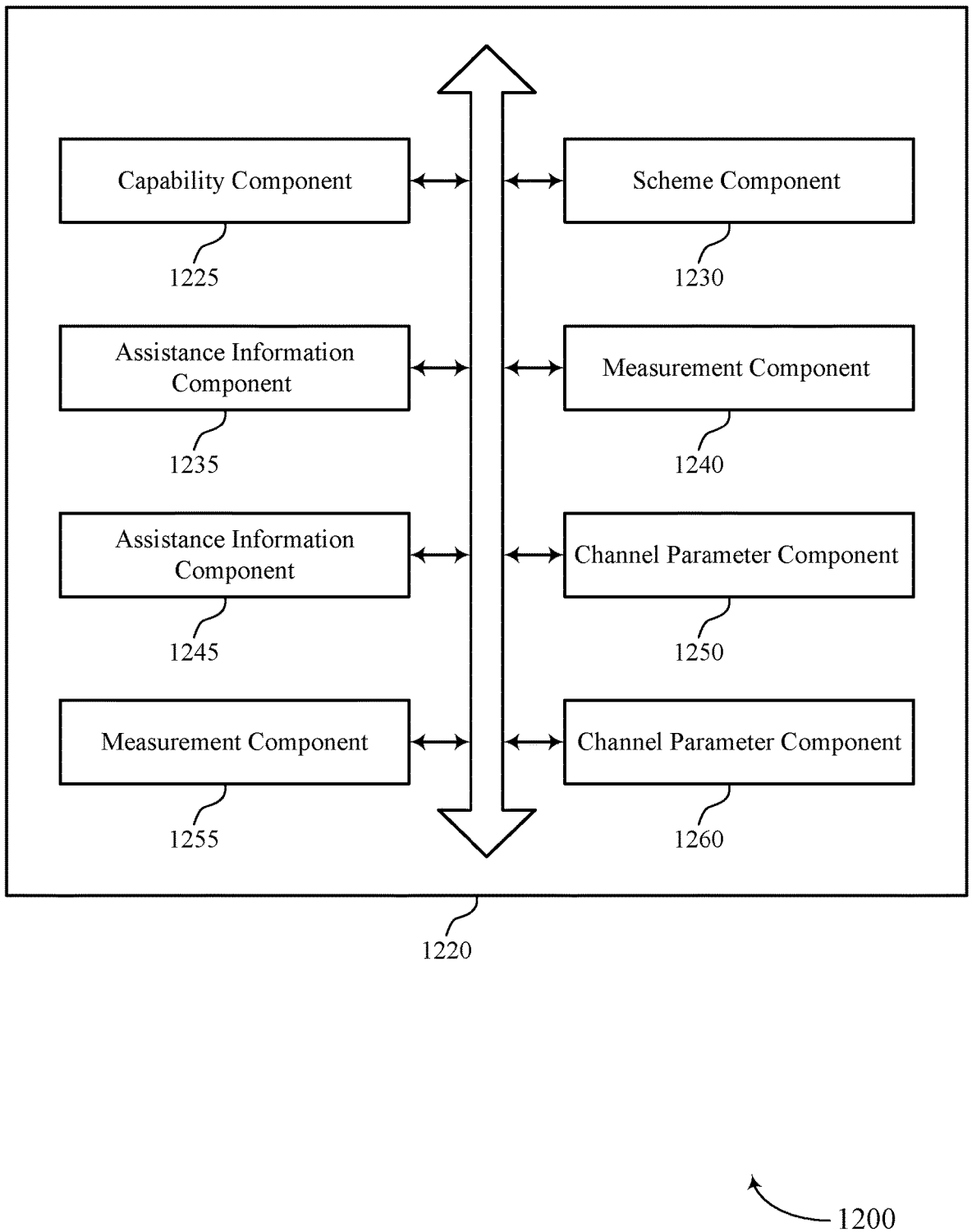
FIG. 12 shows a block diagram of a communications manager that supports sensing and signaling of inter-UE CLI characteristics in accordance with one or more aspects of the present disclosure.

FIG. 12 shows a block diagram 1200 of a communications manager 1220 that supports sensing and signaling of inter-UE CLI characteristics in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of sensing and signaling of inter-UE CLI characteristics as described herein. For example, the communications manager 1220 may include a capability component 1225, a scheme component 1230, an assistance information component 1235, a measurement component 1240, an assistance information component 1245, a channel parameter component 1250, a measurement component 1255, a channel parameter component 1260, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The capability component 1225 may be configured as or otherwise support a means for receiving, from a UE, capability information indicating a capability of the UE to support one or more schemes for determining characteristics of an inter-UE CLI channel over a time period. The scheme component 1230 may be configured as or otherwise support a means for transmitting, to the UE and based on the capability information, an indication of a selected scheme of the one or more schemes for determining the characteristics of the inter-UE CLI channel. The assistance information component 1235 may be configured as or otherwise support a means for receiving, from the UE, assistance information in accordance with the selected scheme, the assistance information pertaining to the inter-UE CLI channel.

In some examples, to support receiving the assistance information, the measurement component 1240 may be configured as or otherwise support a means for receiving a set of multiple measurements of the characteristics of the inter-UE CLI channel in accordance with the selected scheme, where the assistance information includes the set of multiple measurements of the characteristics of the inter-UE CLI channel.

In some examples, the assistance information component 1245 may be configured as or otherwise support a means for receiving, from the UE, an indication of a channel variation in time of the inter-UE CLI channel, where the channel variation in time of the inter-UE CLI channel is based on a rate of change of the characteristics of the inter-UE CLI channel.

In some examples, to support receiving the indication of the channel variation, the assistance information component 1245 may be configured as or otherwise support a means for receiving an indication of a likelihood that the inter-UE CLI channel is varying over a time period.

In some examples, the indication of the likelihood that the inter-UE CLI channel is varying includes a value from a range of values indicating a degree with which the inter-UE CLI channel is varying. In some examples, the indication of the likelihood that the inter-UE CLI channel is varying includes a one-bit indication.

In some examples, the assistance information component 1245 may be configured as or otherwise support a means for receiving, from the UE, an indication of at least one of an estimation of coherence time associated with a variation of the inter-UE CLI channel, a coherence time metric, one or more statistics related to the inter-UE CLI channel, an inter-UE CLI channel feedback, or a combination thereof, where the estimation is based on the characteristics of the inter-UE CLI channel.

In some examples, the channel parameter component 1250 may be configured as or otherwise support a means for transmitting, to the UE, one or more updated channel parameters in response to receiving the assistance information. In some examples, the measurement component 1255 may be configured as or otherwise support a means for transmitting, to the UE, a request to measure the characteristics of the inter-UE CLI channel.

In some examples, the channel parameter component 1260 may be configured as or otherwise support a means for transmitting, to the UE, a configuration for a first set of SRSs associated with a first periodicity and a configuration for a second set of SRSs associated with a second periodicity, where the first set of SRSs and the second set of SRSs are determined based on the assistance information.

In some examples, the channel parameter component 1260 may be configured as or otherwise support a means for transmitting, to the UE, a configuration for a set of precoded SRSs for inter-UE CLI channel measurement or a set of unprecoded SRSs for inter-UE CLI channel measurement or both. In some examples, the assistance information includes at least one of a CLI report, an RSRP report, a CLI channel impulse response, frequency domain channel information, or a combination thereof.

Figure 13:
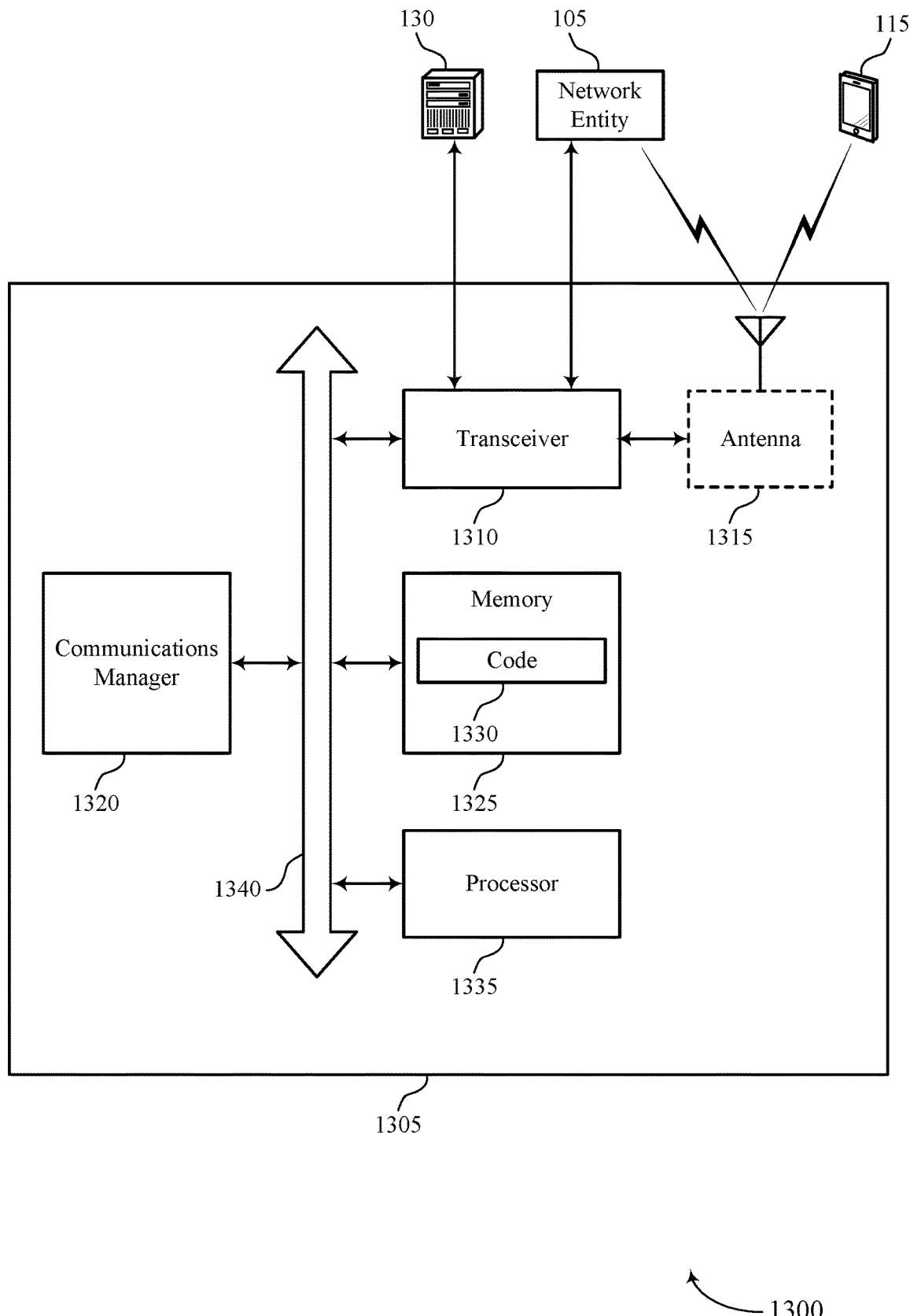
FIG. 13 shows a diagram of a system including a device that supports sensing and signaling of inter-UE CLI characteristics in accordance with one or more aspects of the present disclosure.

FIG. 13 shows a diagram of a system 1300 including a device 1305 that supports sensing and signaling of inter-UE CLI characteristics in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting sensing and signaling of inter-UE CLI characteristics). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1305 may transmit information output from the chip or modem. In some implementations, the second interface may refer to an interface between the processing system of the chip or modem and a receiver, such that the device 1305 may obtain information or signal inputs, and the information may be passed to the processing system. A person having ordinary skill in the art will readily recognize that the first interface also may obtain information or signal inputs, and the second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with ULEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for receiving, from a UE, capability information indicating a capability of the UE to support one or more schemes for determining characteristics of an inter-UE CLI channel over a time period. The communications manager 1320 may be configured as or otherwise support a means for transmitting, to the UE and based on the capability information, an indication of a selected scheme of the one or more schemes for determining the characteristics of the inter-UE CLI channel. The communications manager 1320 may be configured as or otherwise support a means for receiving, from the UE, assistance information in accordance with the selected scheme, the assistance information pertaining to the inter-UE CLI channel.

By including or configuring the communications manager 1320 in accordance with examples as described herein, the device 1305 may support techniques for improved communication reliability, reduced latency, improved user experience related to reduced processing, reduced power consumption, more efficient utilization of communication resources, and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of sensing and signaling of inter-UE CLI characteristics as described herein, or the processor 1335 and the memory 1325 may be otherwise configured to perform or support such operations.

Figure 14:
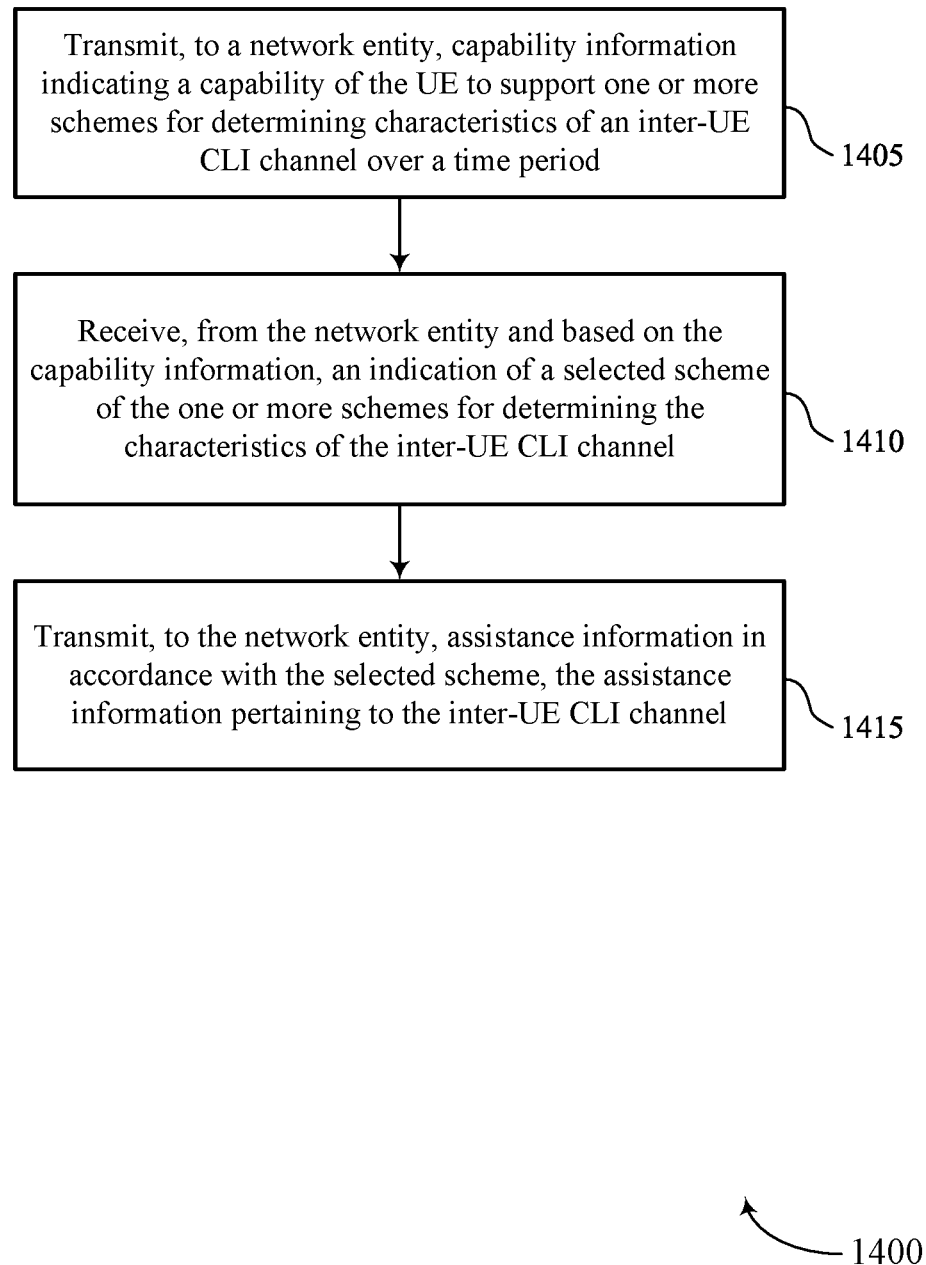
FIGS. 14 through 17 show flowcharts illustrating methods that support sensing and signaling of inter-UE CLI characteristics in accordance with one or more aspects of the present disclosure.

FIG. 14 shows a flowchart illustrating a method 1400 that supports sensing and signaling of inter-UE CLI characteristics in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include transmitting, to a network entity, capability information indicating a capability of the UE to support one or more schemes for determining characteristics of an inter-UE CLI channel over a time period. The operations of 1405 may be performed in accordance with examples as disclosed herein. In some examples, aspects of the operations of 1405 may be performed by a capability component 825 as described with reference to FIG. 8.

At 1410, the method may include receiving, from the network entity and based on the capability information, an indication of a selected scheme of the one or more schemes for determining the characteristics of the inter-UE CLI channel. The operations of 1410 may be performed in accordance with examples as disclosed herein. In some examples, aspects of the operations of 1410 may be performed by a scheme component 830 as described with reference to FIG. 8.

At 1415, the method may include transmitting, to the network entity, assistance information in accordance with the selected scheme, the assistance information pertaining to the inter-UE CLI channel. The operations of 1415 may be performed in accordance with examples as disclosed herein. In some examples, aspects of the operations of 1415 may be performed by an assistance information component 835 as described with reference to FIG. 8.

Figure 15:
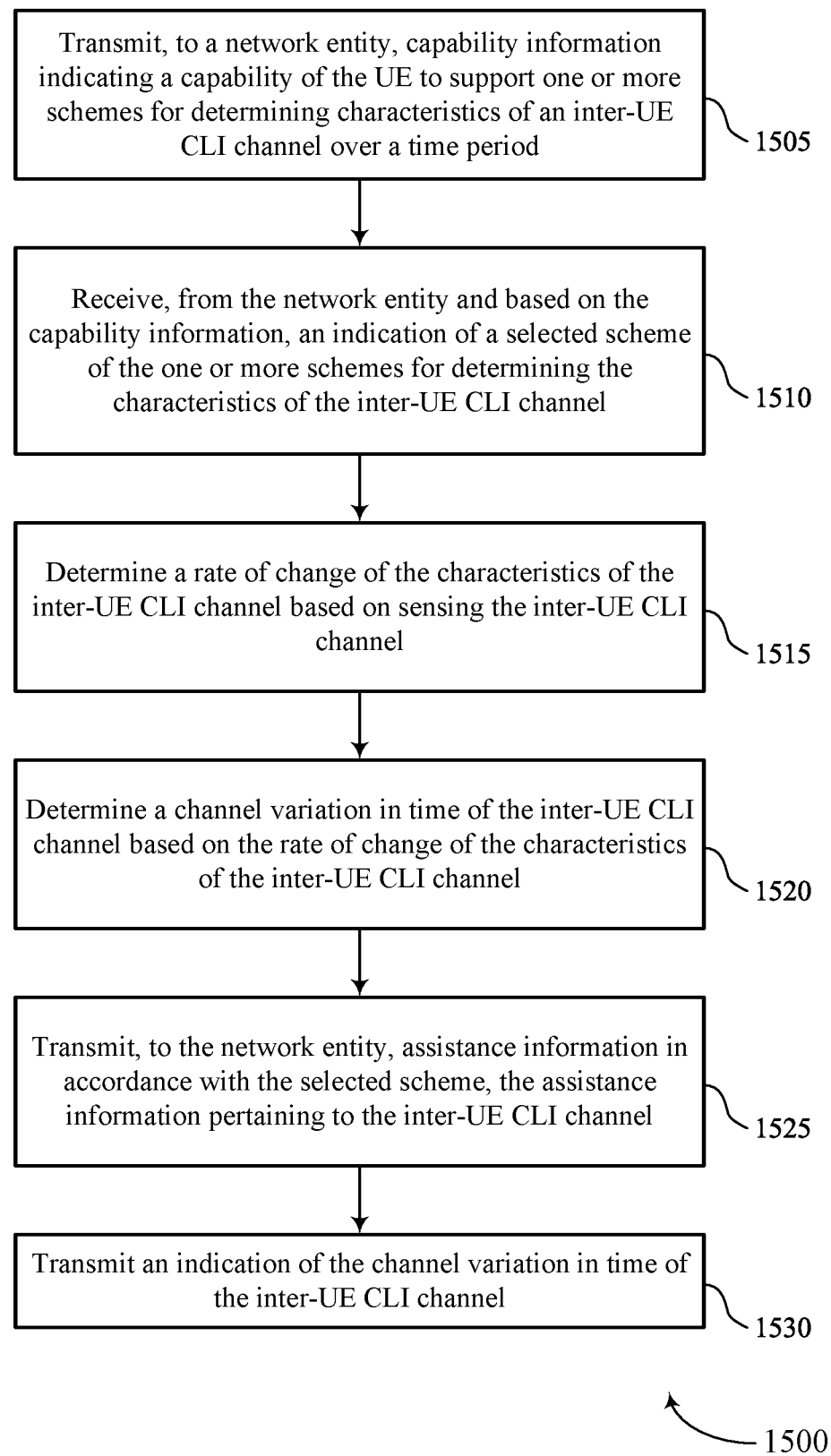

FIG. 15 shows a flowchart illustrating a method 1500 that supports sensing and signaling of inter-UE CLI characteristics in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting, to a network entity, capability information indicating a capability of the UE to support one or more schemes for determining characteristics of an inter-UE CLI channel over a time period. The operations of 1505 may be performed in accordance with examples as disclosed herein. In some examples, aspects of the operations of 1505 may be performed by a capability component 825 as described with reference to FIG. 8.

At 1510, the method may include receiving, from the network entity and based on the capability information, an indication of a selected scheme of the one or more schemes for determining the characteristics of the inter-UE CLI channel. The operations of 1510 may be performed in accordance with examples as disclosed herein. In some examples, aspects of the operations of 1510 may be performed by a scheme component 830 as described with reference to FIG. 8.

At 1515, the method may include determining a rate of change of the characteristics of the inter-UE CLI channel based on sensing the inter-UE CLI channel. The operations of 1515 may be performed in accordance with examples as disclosed herein. In some examples, aspects of the operations of 1515 may be performed by a channel characteristics determination component 845 as described with reference to FIG. 8.

At 1520, the method may include determining a channel variation in time of the inter-UE CLI channel based on the rate of change of the characteristics of the inter-UE CLI channel. The operations of 1520 may be performed in accordance with examples as disclosed herein. In some examples, aspects of the operations of 1520 may be performed by a channel characteristics determination component 845 as described with reference to FIG. 8.

At 1525, the method may include transmitting, to the network entity, assistance information in accordance with the selected scheme, the assistance information pertaining to the inter-UE CLI channel. The operations of 1525 may be performed in accordance with examples as disclosed herein. In some examples, aspects of the operations of 1525 may be performed by an assistance information component 835 as described with reference to FIG. 8.

At 1530, the method may include transmitting an indication of the channel variation in time of the inter-UE CLI channel. The operations of 1530 may be performed in accordance with examples as disclosed herein. In some examples, aspects of the operations of 1530 may be performed by an assistance information component 835 as described with reference to FIG. 8.

Figure 16:
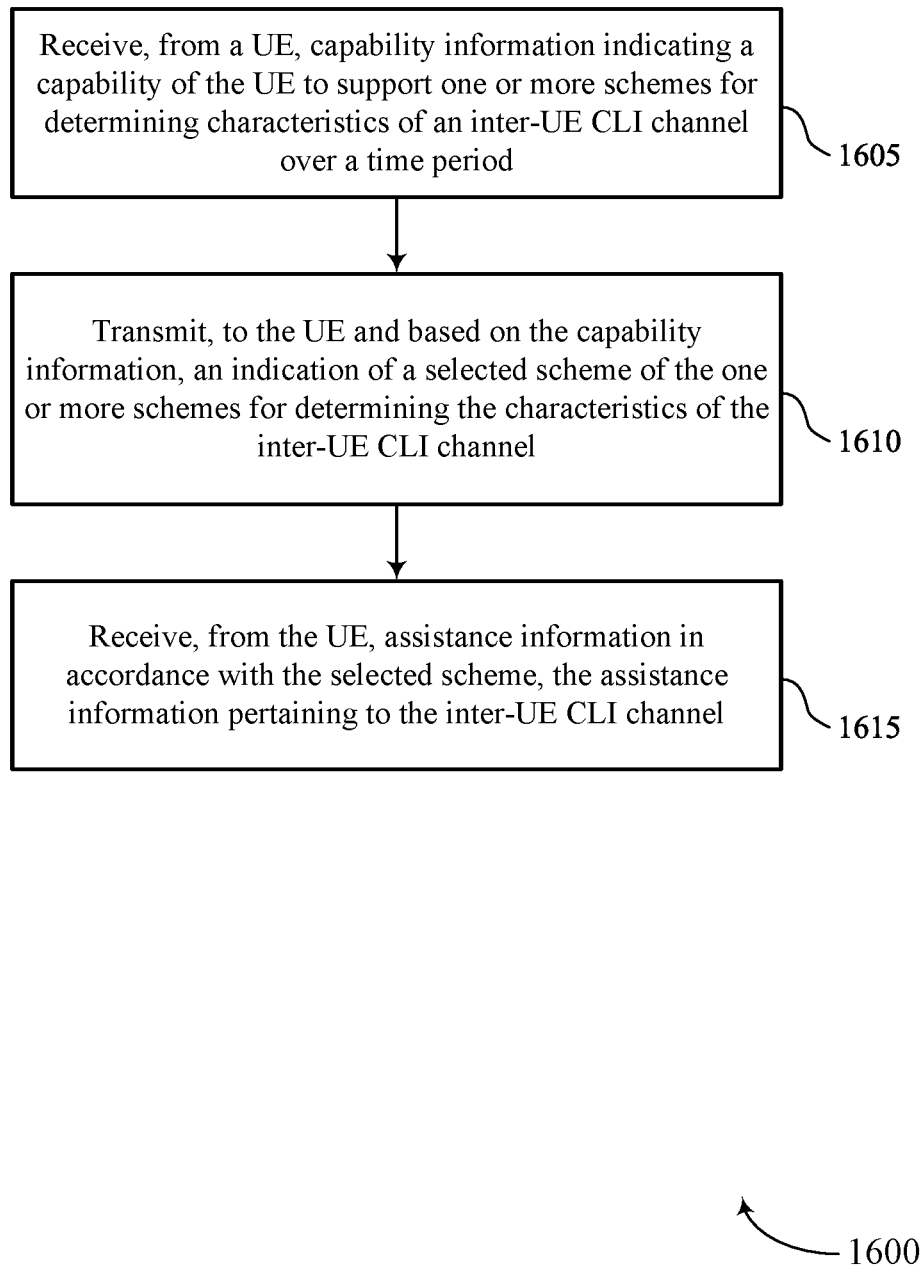

FIG. 16 shows a flowchart illustrating a method 1600 that supports sensing and signaling of inter-UE CLI characteristics in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a UE, capability information indicating a capability of the UE to support one or more schemes for determining characteristics of an inter-UE CLI channel over a time period. The operations of 1605 may be performed in accordance with examples as disclosed herein. In some examples, aspects of the operations of 1605 may be performed by a capability component 1225 as described with reference to FIG. 12.

At 1610, the method may include transmitting, to the UE and based on the capability information, an indication of a selected scheme of the one or more schemes for determining the characteristics of the inter-UE CLI channel. The operations of 1610 may be performed in accordance with examples as disclosed herein. In some examples, aspects of the operations of 1610 may be performed by a scheme component 1230 as described with reference to FIG. 12.

At 1615, the method may include receiving, from the UE, assistance information in accordance with the selected scheme, the assistance information pertaining to the inter-UE CLI channel. The operations of 1615 may be performed in accordance with examples as disclosed herein. In some examples, aspects of the operations of 1615 may be performed by an assistance information component 1235 as described with reference to FIG. 12.

Figure 17:
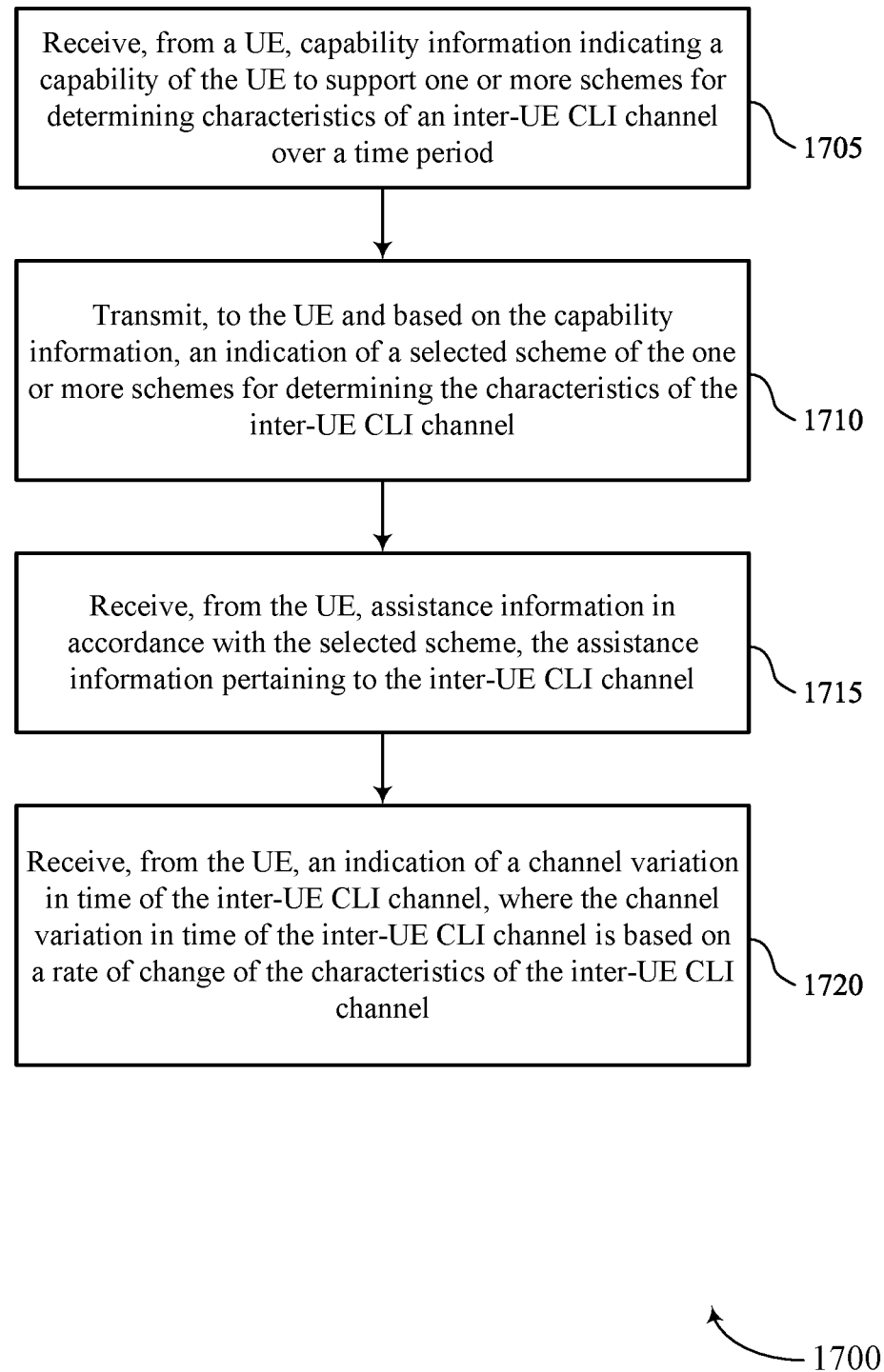

FIG. 17 shows a flowchart illustrating a method 1700 that supports sensing and signaling of inter-UE CLI characteristics in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from a UE, capability information indicating a capability of the UE to support one or more schemes for determining characteristics of an inter-UE CLI channel over a time period. The operations of 1705 may be performed in accordance with examples as disclosed herein. In some examples, aspects of the operations of 1705 may be performed by a capability component 1225 as described with reference to FIG. 12.

At 1710, the method may include transmitting, to the UE and based on the capability information, an indication of a selected scheme of the one or more schemes for determining the characteristics of the inter-UE CLI channel. The operations of 1710 may be performed in accordance with examples as disclosed herein. In some examples, aspects of the operations of 1710 may be performed by a scheme component 1230 as described with reference to FIG. 12.

At 1715, the method may include receiving, from the UE, assistance information in accordance with the selected scheme, the assistance information pertaining to the inter-UE CLI channel. The operations of 1715 may be performed in accordance with examples as disclosed herein. In some examples, aspects of the operations of 1715 may be performed by an assistance information component 1235 as described with reference to FIG. 12.

At 1720, the method may include receiving, from the UE, an indication of a channel variation in time of the inter-UE CLI channel, where the channel variation in time of the inter-UE CLI channel is based on a rate of change of the characteristics of the inter-UE CLI channel. The operations of 1720 may be performed in accordance with examples as disclosed herein. In some examples, aspects of the operations of 1720 may be performed by an assistance information component 1245 as described with reference to FIG. 12.

The following provides an overview of aspects of the present disclosure:

Aspect 1: A method for wireless communication at a UE, comprising: transmitting, to a network entity, capability information indicating a capability of the UE to support one or more schemes for determining characteristics of an inter-UE CLI channel over a time period; receiving, from the network entity and based at least in part on the capability information, an indication of a selected scheme of the one or more schemes for determining the characteristics of the inter-UE CLI channel; and transmitting, to the network entity, assistance information in accordance with the selected scheme, the assistance information pertaining to the inter-UE CLI channel.

Aspect 2: The method of aspect 1, further comprising: performing a plurality of measurements of the characteristics of the inter-UE CLI channel in accordance with the selected scheme, wherein the assistance information comprises the plurality of measurements of the characteristics of the inter-UE CLI channel.

Aspect 3: The method of any of aspects 1 through 2, further comprising: determining a rate of change of the characteristics of the inter-UE CLI channel based at least in part on sensing the inter-UE CLI channel; determining a channel variation in time of the inter-UE CLI channel based at least in part on the rate of change of the characteristics of the inter-UE CLI channel; and transmitting an indication of the channel variation in time of the inter-UE CLI channel.

Aspect 4: The method of aspect 3, wherein transmitting the indication of the channel variation further comprises: transmitting an indication of a likelihood that the inter-UE CLI channel is varying over a time period.

Aspect 5: The method of aspect 4, wherein the indication of the likelihood that the inter-UE CLI channel is varying comprises a value from a range of values indicating a degree with which the inter-UE CLI channel is varying.

Aspect 6: The method of any of aspects 4 through 5, wherein the indication of the likelihood that the inter-UE CLI channel is varying comprises a one-bit indication.

Aspect 7: The method of any of aspects 1 through 6, further comprising: performing a plurality of measurements of the characteristics of the inter-UE CLI channel in accordance with the selected scheme; determining, based at least in part on the plurality of measurements of the characteristics of the inter-UE CLI channel, at least one of an estimation of coherence time associated with a variation of the inter-UE CLI channel, a coherence time metric, one or more statistics related to the inter-UE CLI channel, an inter-UE CLI channel feedback, or a combination thereof; and transmitting, to the network entity, an indication of at least one of the estimation of coherence time, the coherence time metric, the one or more statistics related to the inter-UE CLI channel, the inter-UE CLI channel feedback, or a combination thereof.

Aspect 8: The method of any of aspects 1 through 7, further comprising: compressing the assistance information prior to transmitting the assistance information to the network entity, wherein compressing the assistance information comprises compressing the inter-UE CLI channel using an auto-encoder.

Aspect 9: The method of any of aspects 1 through 8, further comprising: receiving, from the network entity, one or more updated channel parameters in response to transmitting the assistance information.

Aspect 10: The method of any of aspects 1 through 9, further comprising: receiving, from the network entity, a request to measure the characteristics of the inter-UE CLI channel; and performing a plurality of measurements of the characteristics of the inter-UE CLI channel based at least in part on receiving the request.

Aspect 11: The method of any of aspects 1 through 10, further comprising: receiving, from the network entity, a configuration for a first set of SRSs associated with a first periodicity and a configuration for a second set of SRSs associated with a second periodicity, wherein the first set of SRSs and the second set of SRSs are determined based at least in part on the assistance information.

Aspect 12: The method of any of aspects 1 through 11, further comprising: receiving, from the network entity, a configuration for a set of precoded SRSs for inter-UE CLI channel measurement or a set of unprecoded SRSs for inter-UE CLI channel measurement or both.

Aspect 13: The method of any of aspects 1 through 12, wherein the assistance information comprises at least one of a CLI report, an RSRP report, a CLI channel impulse response, frequency domain channel information, or a combination thereof.

Aspect 14: A method for wireless communication at a network entity, comprising: receiving, from a UE, capability information indicating a capability of the UE to support one or more schemes for determining characteristics of an inter-UE CLI channel over a time period; transmitting, to the UE and based at least in part on the capability information, an indication of a selected scheme of the one or more schemes for determining the characteristics of the inter-UE CLI channel; and receiving, from the UE, assistance information in accordance with the selected scheme, the assistance information pertaining to the inter-UE CLI channel.

Aspect 15: The method of aspect 14, wherein receiving the assistance information comprises: receiving a plurality of measurements of the characteristics of the inter-UE CLI channel in accordance with the selected scheme, wherein the assistance information comprises the plurality of measurements of the characteristics of the inter-UE CLI channel.

Aspect 16: The method of any of aspects 14 through 15, further comprising: receiving, from the UE, an indication of a channel variation in time of the inter-UE CLI channel, wherein the channel variation in time of the inter-UE CLI channel is based at least in part on a rate of change of the characteristics of the inter-UE CLI channel.

Aspect 17: The method of aspect 16, wherein receiving the indication of the channel variation further comprises: receiving an indication of a likelihood that the inter-UE CLI channel is varying over a time period.

Aspect 18: The method of aspect 17, wherein the indication of the likelihood that the inter-UE CLI channel is varying comprises a value from a range of values indicating a degree with which the inter-UE CLI channel is varying.

Aspect 19: The method of any of aspects 17 through 18, wherein the indication of the likelihood that the inter-UE CLI channel is varying comprises a one-bit indication.

Aspect 20: The method of any of aspects 14 through 19, further comprising: receiving, from the UE, an indication of at least one of an estimation of coherence time associated with a variation of the inter-UE CLI channel, a coherence time metric, one or more statistics related to the inter-UE CLI channel, an inter-UE CLI channel feedback, or a combination thereof, wherein the estimation is based at least in part on the characteristics of the inter-UE CLI channel.

Aspect 21: The method of any of aspects 14 through 20, further comprising: transmitting, to the UE, one or more updated channel parameters in response to receiving the assistance information.

Aspect 22: The method of any of aspects 14 through 21, further comprising: transmitting, to the UE, a request to measure the characteristics of the inter-UE CLI channel.

Aspect 23: The method of any of aspects 14 through 22, further comprising: transmitting, to the UE, a configuration for a first set of SRSs associated with a first periodicity and a configuration for a second set of SRSs associated with a second periodicity, wherein the first set of SRSs and the second set of SRSs are determined based at least in part on the assistance information.

Aspect 24: The method of any of aspects 14 through 23, further comprising: transmitting, to the UE, a configuration for a set of precoded SRSs for inter-UE CLI channel measurement or a set of unprecoded SRSs for inter-UE CLI channel measurement or both.

Aspect 25: The method of any of aspects 14 through 24, wherein the assistance information comprises at least one of a CLI report, an RSRP report, a CLI channel impulse response, frequency domain channel information, or a combination thereof.

Aspect 26: An apparatus for wireless communication at a UE, comprising a processor; memory coupled with the processor; and instructions stored in the memory and executable by the processor to cause the apparatus to perform a method of any of aspects 1 through 13.

Aspect 27: An apparatus for wireless communication at a UE, comprising at least one means for performing a method of any of aspects 1 through 13.

Aspect 28: A non-transitory computer-readable medium storing code for wireless communication at a UE, the code comprising instructions executable by a processor to perform a method of any of aspects 1 through 13.

Aspect 29: An apparatus for wireless communication at a network entity, comprising a processor; memory coupled with the processor; and instructions stored in the memory and executable by the processor to cause the apparatus to perform a method of any of aspects 14 through 25.

Aspect 30: An apparatus for wireless communication at a network entity, comprising at least one means for performing a method of any of aspects 14 through 25.

Aspect 31: A non-transitory computer-readable medium storing code for wireless communication at a network entity, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting, to a network entity, capability information indicating a capability of the UE to support one or more schemes for determining characteristics of an inter-UE cross link interference channel over a time period, wherein the one or more schemes comprise a first scheme associated with unprecoded reference signals and a second scheme associated with precoded reference signals;

receiving, from the network entity and based at least in part on the capability information, an indication of a selected scheme of the one or more schemes for determining the characteristics of the inter-UE cross link interference channel; and transmitting, to the network entity, assistance information in accordance with the selected scheme, the assistance information pertaining to the inter-UE cross link interference channel.

2. The method of claim 1, further comprising:
performing a plurality of measurements of the characteristics of the inter-UE cross link interference channel in accordance with the selected scheme, wherein the assistance information comprises the plurality of measurements of the characteristics of the inter-UE cross link interference channel.

3. The method of claim 1, further comprising:
determining a rate of change of the characteristics of the inter-UE cross link interference channel based at least in part on sensing the inter-UE cross link interference channel;
determining a channel variation in time of the inter-UE cross link interference channel based at least in part on the rate of change of the characteristics of the inter-UE cross link interference channel; and
transmitting an indication of the channel variation in time of the inter-UE cross link interference channel.

4. The method of claim 3, wherein transmitting the indication of the channel variation further comprises:
transmitting an indication of a likelihood that the inter-UE cross link interference channel is varying over a time period.

5. The method of claim 4, wherein the indication of the likelihood that the inter-UE cross link interference channel is varying comprises a value from a range of values indicating a degree with which the inter-UE cross link interference channel is varying.

6. The method of claim 4, wherein the indication of the likelihood that the inter-UE cross link interference channel is varying comprises a one-bit indication.

7. The method of claim 1, further comprising:
performing a plurality of measurements of the characteristics of the inter-UE cross link interference channel in accordance with the selected scheme;
determining, based at least in part on the plurality of measurements of the characteristics of the inter-UE cross link interference channel, at least one of an estimation of coherence time associated with a variation of the inter-UE cross link interference channel, a coherence time metric, one or more statistics related to the inter-UE cross link interference channel, an inter-UE cross link interference channel feedback, or a combination thereof; and
transmitting, to the network entity, an indication of at least one of the estimation of coherence time, the coherence time metric, the one or more statistics related to the inter-UE cross link interference channel, the inter-UE cross link interference channel feedback, or a combination thereof.

8. The method of claim 1, further comprising:
compressing the assistance information prior to transmitting the assistance information to the network entity, wherein compressing the assistance information comprises compressing the inter-UE cross link interference channel using an auto-encoder.

9. The method of claim 1, further comprising:
receiving, from the network entity, one or more updated channel parameters in response to transmitting the assistance information.

10. The method of claim 1, further comprising:
receiving, from the network entity, a request to measure the characteristics of the inter-UE cross link interference channel; and
performing a plurality of measurements of the characteristics of the inter-UE cross link interference channel based at least in part on receiving the request.

11. The method of claim 1, further comprising:
receiving, from the network entity, a configuration for a first set of sounding reference signals associated with a first periodicity and a configuration for a second set of sounding reference signals associated with a second periodicity, wherein the first set of sounding reference signals and the second set of sounding reference signals are determined based at least in part on the assistance information.

12. The method of claim 1, further comprising:
receiving, from the network entity, a configuration for a set of precoded sounding reference signals for inter-UE cross link interference channel measurement or a set of unprecoded sounding reference signals for inter-UE cross link interference channel measurement or both.

13. The method of claim 1, wherein the assistance information comprises at least one of a cross link interference report, a reference signal received power report, a cross link interference channel impulse response, frequency domain channel information, or a combination thereof.

14. A method for wireless communication at a network entity, comprising:
receiving, from a user equipment (UE), capability information indicating a capability of the UE to support one or more schemes for determining characteristics of an inter-UE cross link interference channel over a time period, wherein the one or more schemes comprise a first scheme associated with unprecoded reference signals and a second scheme associated with precoded reference signals;
transmitting, to the UE and based at least in part on the capability information, an indication of a selected scheme of the one or more schemes for determining the characteristics of the inter-UE cross link interference channel; and
receiving, from the UE, assistance information in accordance with the selected scheme, the assistance information pertaining to the inter-UE cross link interference channel.

15. The method of claim 14, wherein receiving the assistance information comprises:
receiving a plurality of measurements of the characteristics of the inter-UE cross link interference channel in accordance with the selected scheme, wherein the assistance information comprises the plurality of measurements of the characteristics of the inter-UE cross link interference channel.

16. The method of claim 14, further comprising:
receiving, from the UE, an indication of a channel variation in time of the inter-UE cross link interference channel, wherein the channel variation in time of the inter-UE cross link interference channel is based at least in part on a rate of change of the characteristics of the inter-UE cross link interference channel.

17. The method of claim 16, wherein receiving the indication of the channel variation further comprises:
receiving an indication of a likelihood that the inter-UE cross link interference channel is varying over a time period.

18. The method of claim 17, wherein the indication of the likelihood that the inter-UE cross link interference channel is varying comprises a value from a range of values indicating a degree with which the inter-UE cross link interference channel is varying.

19. The method of claim 17, wherein the indication of the likelihood that the inter-UE cross link interference channel is varying comprises a one-bit indication.

20. The method of claim 14, further comprising:
receiving, from the UE, an indication of at least one of an estimation of coherence time associated with a variation of the inter-UE cross link interference channel, a coherence time metric, one or more statistics related to the inter-UE cross link interference channel, an inter-UE cross link interference channel feedback, or a combination thereof, wherein the estimation is based at least in part on the characteristics of the inter-UE cross link interference channel.

21. The method of claim 14, further comprising:
transmitting, to the UE, one or more updated channel parameters in response to receiving the assistance information.

22. The method of claim 14, further comprising:
transmitting, to the UE, a request to measure the characteristics of the inter-UE cross link interference channel.

23. The method of claim 14, further comprising:
transmitting, to the UE, a configuration for a first set of sounding reference signals associated with a first periodicity and a configuration for a second set of sounding reference signals associated with a second periodicity, wherein the first set of sounding reference signals and the second set of sounding reference signals are determined based at least in part on the assistance information.

24. The method of claim 14, further comprising:
transmitting, to the UE, a configuration for a set of precoded sounding reference signals for inter-UE cross link interference channel measurement or a set of unprecoded sounding reference signals for inter-UE cross link interference channel measurement or both.

25. The method of claim 14, wherein the assistance information comprises at least one of a cross link interference report, a reference signal received power report, a cross link interference channel impulse response, frequency domain channel information, or a combination thereof.

26. An apparatus for wireless communication at a user equipment (UE), comprising:
at least one processor;
at least one memory coupled with the at least one processor; and
instructions stored in the at least one memory and executable by the at least one processor to cause the apparatus to:
transmit, to a network entity, capability information indicating a capability of the UE to support one or more schemes for determining characteristics of an inter-UE cross link interference channel over a time period, wherein the one or more schemes comprise a first scheme associated with unprecoded reference signals and a second scheme associated with precoded reference signals;
receive, from the network entity and based at least in part on the capability information, an indication of a selected scheme of the one or more schemes for determining the characteristics of the inter-UE cross link interference channel; and
transmit, to the network entity, assistance information in accordance with the selected scheme, the assistance information pertaining to the inter-UE cross link interference channel.

27. The apparatus of claim 26, wherein the instructions are further executable by the at least one processor to cause the apparatus to:
perform a plurality of measurements of the characteristics of the inter-UE cross link interference channel in accordance with the selected scheme, wherein the assistance information comprises the plurality of measurements of the characteristics of the inter-UE cross link interference channel.

28. The apparatus of claim 26, wherein the instructions are further executable by the at least one processor to cause the apparatus to:
determine a rate of change of the characteristics of the inter-UE cross link interference channel based at least in part on sensing the inter-UE cross link interference channel;
determine a channel variation in time of the inter-UE cross link interference channel based at least in part on the rate of change of the characteristics of the inter-UE cross link interference channel; and
transmit an indication of the channel variation in time of the inter-UE cross link interference channel.

29. An apparatus for wireless communication at a network entity, comprising:
at least one processor;
at least one memory coupled with the at least one processor; and
instructions stored in the at least one memory and executable by the at least one processor to cause the apparatus to:
receive, from a user equipment (UE), capability information indicating a capability of the UE to support one or more schemes for determining characteristics of an inter-UE cross link interference channel over a time period, wherein the one or more schemes comprise a first scheme associated with unprecoded reference signals and a second scheme associated with precoded reference signals;
transmit, to the UE and based at least in part on the capability information, an indication of a selected scheme of the one or more schemes for determining the characteristics of the inter-UE cross link interference channel; and
receive, from the UE, assistance information in accordance with the selected scheme, the assistance information pertaining to the inter-UE cross link interference channel.

30. The apparatus of claim 29, wherein the instructions to receive the assistance information are executable by the at least one processor to cause the apparatus to:
receive a plurality of measurements of the characteristics of the inter-UE cross link interference channel in accordance with the selected scheme, wherein the assistance information comprises the plurality of measurements of the characteristics of the inter-UE cross link interference channel.

* * * * *